United States Patent
Kita et al.

(10) Patent No.: US 10,216,034 B2
(45) Date of Patent: Feb. 26, 2019

(54) LIQUID CRYSTAL DISPLAY DEVICE

(71) Applicant: Sharp Kabushiki Kaisha, Sakai, Osaka (JP)

(72) Inventors: Yuichi Kita, Sakai (JP); Yoshiki Nakatani, Sakai (JP); Takahiro Sasaki, Sakai (JP); Iori Aoyama, Sakai (JP); Kazutaka Hanaoka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/318,037

(22) PCT Filed: Jun. 12, 2015

(86) PCT No.: PCT/JP2015/066977
§ 371 (c)(1),
(2) Date: Dec. 12, 2016

(87) PCT Pub. No.: WO2015/190588
PCT Pub. Date: Dec. 17, 2015

(65) Prior Publication Data
US 2017/0115527 A1 Apr. 27, 2017

(30) Foreign Application Priority Data
Jun. 13, 2014 (JP) .................................. 2014-122443

(51) Int. Cl.
*G02F 1/1335* (2006.01)
*G02F 1/1347* (2006.01)
(Continued)

(52) U.S. Cl.
CPC ...... *G02F 1/133528* (2013.01); *G02F 1/1337* (2013.01); *G02F 1/1347* (2013.01);
(Continued)

(58) Field of Classification Search
CPC ............. G02F 1/133528; G02F 1/1337; G02F 1/134363; G02F 1/1347;
(Continued)

(56) References Cited

U.S. PATENT DOCUMENTS 5,272,553 A * 12/1993 Yamamoto ............ G02F 1/1347
349/143
5,570,211 A * 10/1996 Hanaoka ........... G02F 1/133636
349/123
(Continued)

FOREIGN PATENT DOCUMENTS

JP 2002-365657 A 12/2002
JP 2006-523850 A 10/2006
(Continued)

OTHER PUBLICATIONS

Official Communication issued in International Patent Application No. PCT/JP2015/066977, dated Aug. 25, 2015.

*Primary Examiner* — Nathanael R Briggs
(74) *Attorney, Agent, or Firm* — Keating & Bennett, LLP

(57) ABSTRACT

A liquid crystal display device (100) includes a first liquid crystal display panel (1) configured to be capable of taking a transparent displaying state and a second liquid crystal display panel (2), such that the first liquid crystal display panel allows at least a portion of light going out of the second liquid crystal display panel to be transmitted in the transparent displaying state. The first liquid crystal display panel includes a first liquid crystal layer (1L) interposed between a pair of substrates, and first and second polarizers (1F, 1B) between which the first liquid crystal layer is interposed; the second liquid crystal display panel includes a second liquid crystal layer (2L) interposed between a pair of substrates, and a third polarizer (2F) placed on a side of the second liquid crystal layer that is closer to the first liquid crystal display panel; the second polarizer (1B) of the first
(Continued)

liquid crystal display panel is on a side closer to the second liquid crystal display panel; and a transmission axis of the second polarizer (1B) and a transmission axis of the third polarizer (2F) are not orthogonal.

11 Claims, 13 Drawing Sheets

(51) Int. Cl.
*G02F 1/1343* (2006.01)
*G02F 1/1337* (2006.01)
*G02F 1/139* (2006.01)

(52) U.S. Cl.
CPC .... *G02F 1/13471* (2013.01); *G02F 1/134363* (2013.01); *G02F 1/1396* (2013.01); *G02F 2001/133531* (2013.01); *G02F 2001/134372* (2013.01); *G02F 2001/134381* (2013.01); *G02F 2203/01* (2013.01); *G02F 2203/64* (2013.01)

(58) Field of Classification Search
CPC ........ G02F 2001/133531; G02F 2001/134372; G02F 2001/134381; G02F 2203/01; G02F 2203/64

See application file for complete search history.

(56) References Cited

U.S. PATENT DOCUMENTS

| | | | |
|---|---|---|---|
| 7,042,535 B2* | 5/2006 | Katoh | G02F 1/13363 |
| | | | 348/E9.027 |
| 2005/0024548 A1 | 2/2005 | Choi et al. | |
| 2009/0147186 A1* | 6/2009 | Nakai | G02F 1/13471 |
| | | | 349/74 |
| 2012/0140147 A1 | 6/2012 | Satoh et al. | |
| 2014/0111561 A1* | 4/2014 | Iyama | G09G 3/3648 |
| | | | 345/690 |

FOREIGN PATENT DOCUMENTS

| | | | |
|---|---|---|---|
| JP | 2006-330612 A | | 12/2006 |
| JP | 2006330612 A | * | 12/2006 |
| JP | 2008-216896 A | | 9/2008 |
| WO | 2011/043100 A1 | | 4/2011 |
| WO | 2013/001979 A1 | | 1/2013 |

* cited by examiner (a)

(b)

LIQUID CRYSTAL DISPLAY DEVICE

TECHNICAL FIELD

The present invention relates to a liquid crystal display device, and more particularly to a liquid crystal display device including a liquid crystal display panel which is capable of see-through displaying.

BACKGROUND ART

In recent years, see-through displays have been attracting attention as the display devices for information display systems or digital signage. In a see-through display, the background (i.e., the rear-face side of the display panel) is visible in a see-through manner, whereby information to be indicated on the display panel is displayed as if overlaid on the background. As a result, a novel manner of display that was never possible with conventional display devices can be achieved. Thus, a see-through display has good appeal and eyecatchingness. Application of see-through displays to showcases and show windows has also been proposed.

In the case where a liquid crystal display device is used for a see-through display, its low efficiency of light utilization will be a detriment. The reasons for the low efficiency of light utilization of a liquid crystal display device are the color filters and polarizing plates, which are provided in generic liquid crystal display devices. The color filters and polarizing plates absorb light in specific wavelength regions or light of specific polarization directions.

This has led to the idea of using a liquid crystal display device of the field sequential method. Under the field sequential method, multicolor displaying is performed through time-division switching between colors of light with which a liquid crystal display panel is irradiated from an illumination element. This eliminates the need for color filters, thus improving the efficiency of light utilization. However, in the field sequential method, the liquid crystal display device needs to have a rapid response.

Patent Documents 1 and 2 disclose liquid crystal display devices having improved response characteristics because of an electrode structure being provided which is capable of switchably generating a vertical field and a lateral field across the liquid crystal layer. In the liquid crystal display devices disclosed in Patent Documents 1 and 2, a vertical field is generated across the liquid crystal layer in either one of the transition (rise) from a black displaying state to a white displaying state and the transition (fall) from a white displaying state to a black displaying state, while a lateral field (fringing field) is generated across the liquid crystal layer in the other. Therefore, the torque due to voltage application acts on the liquid crystal molecules in both of a rise and a fall, whereby good response characteristics are attained.

Patent Document 3 also proposes a liquid crystal display device which realizes a rapid response by allowing the alignment regulating force of an electric field to act on the liquid crystal molecules in both a rise and a fall.

CITATION LIST

Patent Literature

[Patent Document 1] Japanese National Phase PCT Laid-Open Publication No. 2006-523850

[Patent Document 2] Japanese Laid-Open Patent Publication No. 2002-365657

[Patent Document 3] International Publication No. 2013/001979

[Patent Document 4] International Publication No. 2011/043100

SUMMARY OF INVENTION

Technical Problem

Patent Document 4 discloses a see-through display in which a PDLC (polymer dispersed liquid crystal) panel or a PNLC (polymer network liquid crystal) panel is used. In accordance with an applied voltage, PDLC panels and PNLC panels are capable of switching between a light scattering state and a light transmitting state for each pixel. When a PDLC panel or a PNLC panel is used, polarizing plates are unnecessary and thus the efficiency of light utilization can be improved.

Moreover, Patent Document 4 also describes a construction where a plurality of PDLC panels are spaced apart but so as to overlap when viewed from a viewer. In this construction, display with a stereoscopic effect, etc., can be achieved by allowing the PDLC panels to display appropriate images.

However, in the case where a PDLC panel is used as a see-through display, it is not possible to conduct black displaying, and thus it is not easy to obtain a displayed image with a sufficient contrast ratio. Also, it has been found through a study by the inventors that, when another display panel is placed on the rear face side of a display panel to be used as a see-through display (which may hereinafter be referred to as a see-through panel), the image from the other display panel may not be properly displayed via the see-through panel in some cases.

The present invention has been made in view of the above problems, and an objective thereof is to attain proper displaying by a liquid crystal display device that includes a plurality of liquid crystal display panels among which a liquid crystal display panel to be used as a see-through panel is included.

Solution to Problem

A liquid crystal display device according to an embodiment of the present invention is a liquid crystal display device comprising: a first liquid crystal display panel and a second liquid crystal display panel, the first liquid crystal display panel being configured to be capable of taking a transparent displaying state, such that the first liquid crystal display panel allows at least a portion of light going out of the second liquid crystal display panel to be transmitted in the transparent displaying state, wherein, the first liquid crystal display panel includes a pair of substrates, a first liquid crystal layer interposed between the pair of substrates, and first and second polarizers between which the first liquid crystal layer is interposed; the second liquid crystal display panel includes a pair of substrates, a second liquid crystal layer interposed between the pair of substrates, and a third polarizer placed on a side of the second liquid crystal layer that is closer to the first liquid crystal display panel; the second polarizer of the first liquid crystal display panel is placed on a side closer to the second liquid crystal display panel; and a transmission axis of the second polarizer and a transmission axis of the third polarizer are not orthogonal.

In one embodiment, the transmission axis of the second polarizer and the transmission axis of the third polarizer constitute an angle of 0° to 45° or less.

In one embodiment, the transmission axis of the second polarizer and the transmission axis of the third polarizer are parallel.

In one embodiment, the first liquid crystal layer is a twisted nematic-type liquid crystal layer, and the first and second polarizers are placed in crossed Nicols.

In one embodiment, the second liquid crystal layer is a twisted nematic-type liquid crystal layer.

In one embodiment, a twist direction of liquid crystal molecules in the first liquid crystal layer of the first liquid crystal display panel and a twist direction of liquid crystal molecules in the second liquid crystal layer of the second liquid crystal display panel are opposite to each other.

In one embodiment, the first liquid crystal display panel is configured to perform multicolor displaying by a field sequential method.

In one embodiment, both of the first and second liquid crystal display panel are configured to perform multicolor displaying by a field sequential method.

In one embodiment, the first liquid crystal display panel does not include any color filters.

In one embodiment, the first liquid crystal display panel and the second liquid crystal display panel at least partially overlap when viewed from a panel-plane normal direction.

In one embodiment, the first liquid crystal display panel includes a first horizontal alignment film on a side of the first liquid crystal layer that is closer to the first polarizer, the first horizontal alignment film having a first direction of alignment regulation and being in contact with the first liquid crystal layer; the second liquid crystal display panel includes a second horizontal alignment film on a side of the second liquid crystal layer that is closer to the third polarizer, the second horizontal alignment film having a second direction of alignment regulation and being in contact with the second liquid crystal layer; and an absorption axis of the first polarizer and the first direction of alignment regulation are parallel, and an absorption axis of the second polarizer and the second direction of alignment regulation are orthogonal.

In one embodiment, the first liquid crystal display panel includes a first horizontal alignment film on a side of the first liquid crystal layer that is closer to the first polarizer, the first horizontal alignment film having a first direction of alignment regulation and being in contact with the first liquid crystal layer; the second liquid crystal display panel includes a second horizontal alignment film on a side of the second liquid crystal layer that is closer to the third polarizer, the second horizontal alignment film having a second direction of alignment regulation and being in contact with the second liquid crystal layer; and an absorption axis of the first polarizer and the first direction of alignment regulation are orthogonal, and an absorption axis of the second polarizer and the second direction of alignment regulation are parallel.

In one embodiment, the first liquid crystal display panel includes a first substrate and a second substrate as the pair of substrates, such that the first liquid crystal layer is interposed between the first substrate and the second substrate; the first substrate includes a first electrode and a second electrode which generates a lateral field across the first liquid crystal layer with the first electrode; the second substrate includes a third electrode which generates a vertical field across the liquid crystal layer with the first electrode and the second electrode, the third electrode opposing the first electrode and the second electrode; and for each pixel, the first liquid crystal display panel is capable of switchably presenting a black displaying state where black displaying is performed with a vertical field generated across the first liquid crystal layer, a white displaying state where white displaying is performed with a lateral field generated across the first liquid crystal layer, and the transparent displaying state, where a rear face side of the first liquid crystal display panel is visible in a see-through manner with no voltage applied to the first liquid crystal layer.

Advantageous Effects of Invention

With a liquid crystal display device according to an embodiment of the present invention, display on another liquid crystal display panel which is placed on the rear face side of the liquid crystal display panel can be properly achieved.

illustrates a displaying state of the see-through panel that also takes into account the influences of displaying light from the rear panel.

Figure 15:
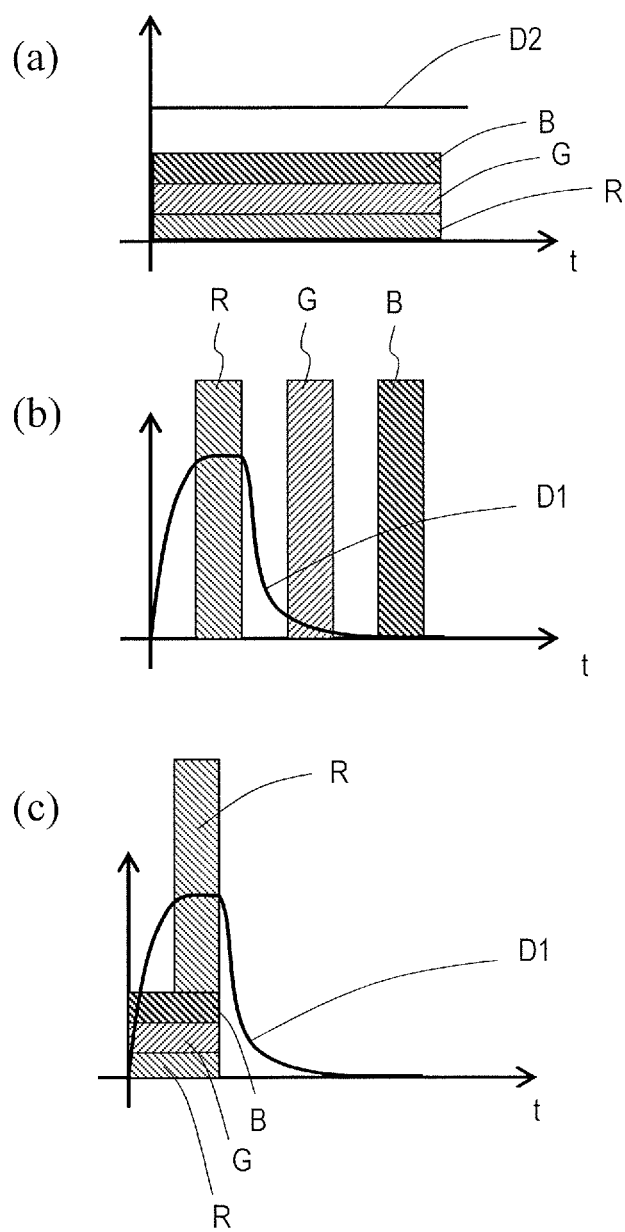

FIG. 15 A diagram showing displaying periods of RGB light and states of transmittance of the liquid crystal layer under a field sequential method according to a reference example of Embodiment 2, where (a) illustrates a state of a rear panel; (b) illustrates a state of a see-through panel; and (c) illustrates a displaying state of the see-through panel that also takes into account the influences of displaying light from the rear panel.

FIG. 16(a) is a perspective view showing a display device according to a reference example of Embodiment 2; and (b) is a perspective view showing a display device according to Embodiment 2.

Figure 17:
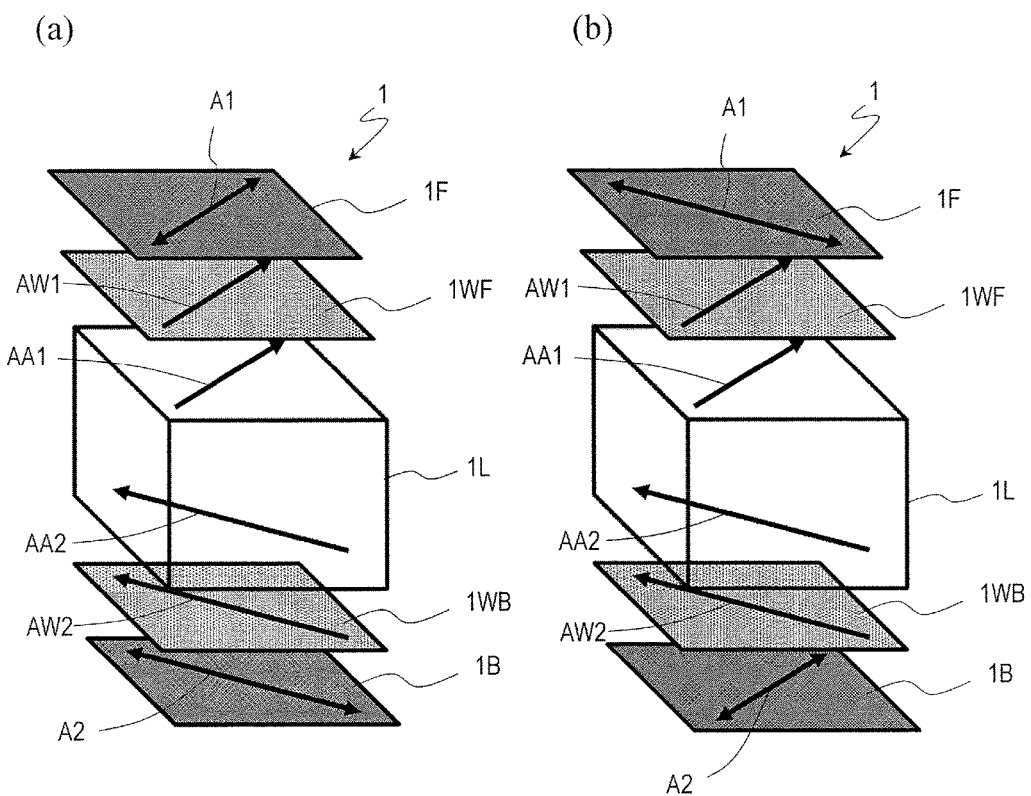

FIG. 17 A diagram showing a liquid crystal display device according to Embodiment 3 of the present invention, where (a) and (b) are perspective views showing respectively different implementations.

Figure 18:
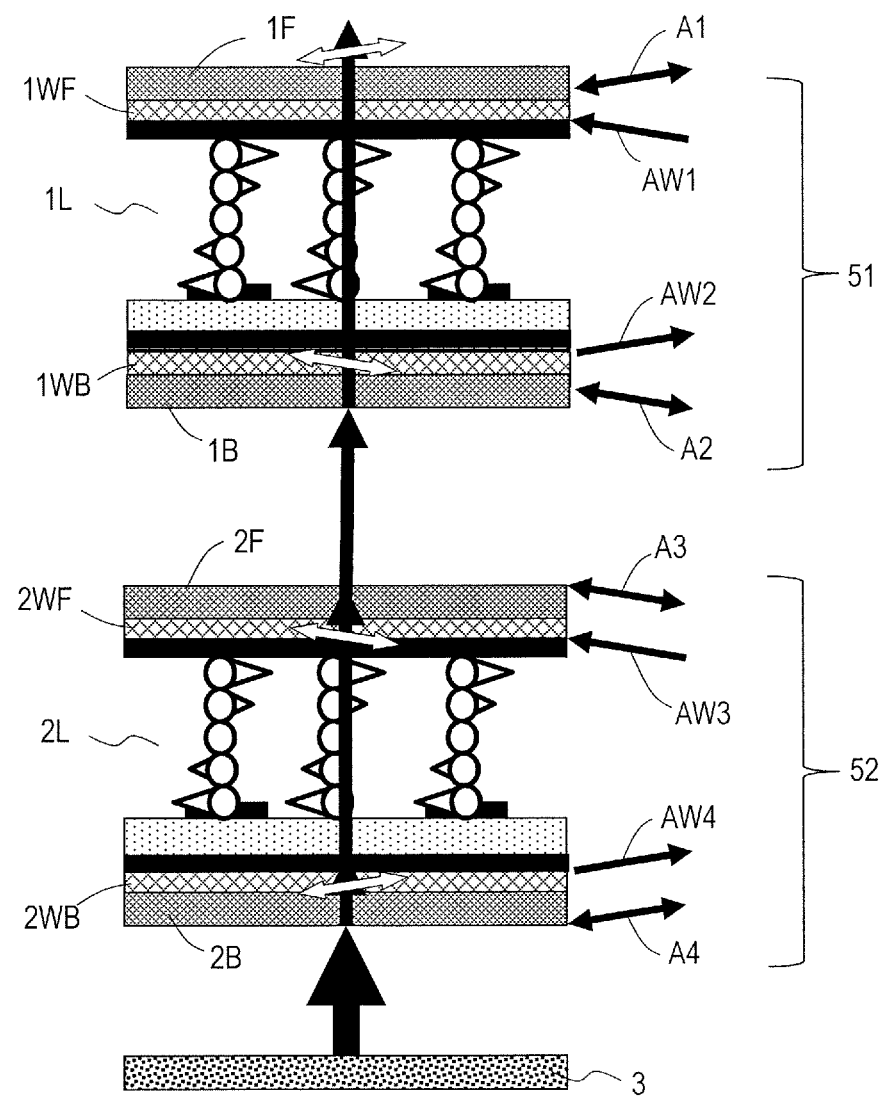

FIG. 18 A cross-sectional view showing a construction for the liquid crystal display device shown in FIG. 17(b).

DESCRIPTION OF EMBODIMENTS

Hereinafter, embodiments of the present invention will be described with reference to the drawings. Note that the present invention is not limited to the following embodiments.

Embodiment 1

Figure 1:
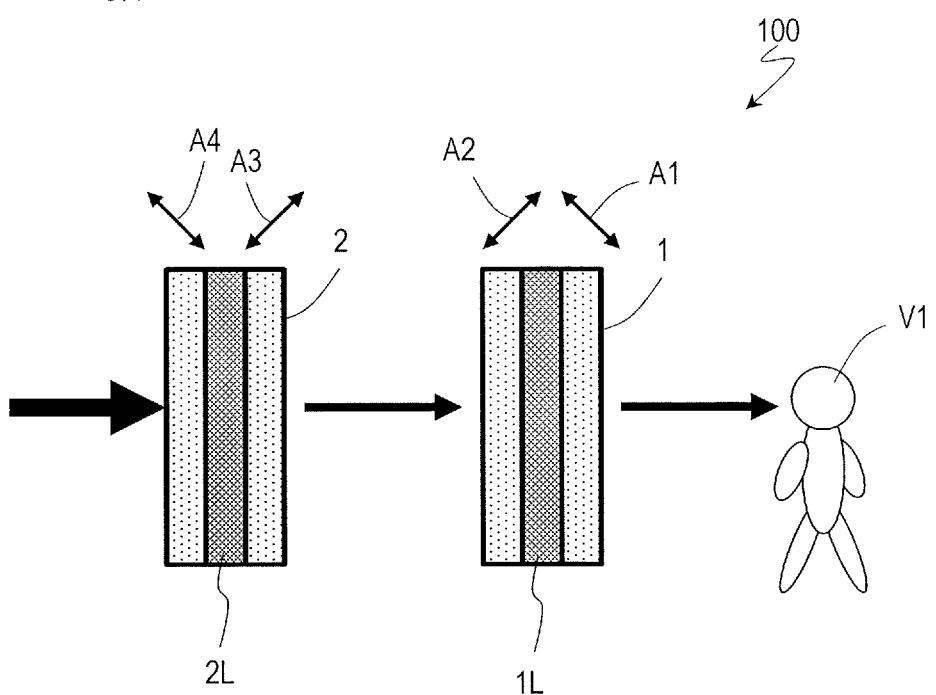
FIG. 1 A side view schematically showing a liquid crystal display device according to Embodiment 1 of the present invention.

FIG. 1 is a schematic side view showing an exemplary construction for a liquid crystal display device 100 according to Embodiment 1. As shown in FIG. 1, the liquid crystal display device 100 includes a see-through panel 1 which is placed on the viewer V1 side (the front face side), and a rear panel 2 which is placed on the rear face side of the see-through panel 1. The see-through panel 1 and the rear panel 2 are placed so as to at least partially overlap as viewed from the panel-plane normal direction (e.g., the frontal direction of the viewer V1). Typically, the see-through panel 1 and the rear panel 2 are spaced apart so that their panel planes are parallel to each other.

The see-through panel 1 is capable of displaying an image on the panel, and allows the background to be seen therethrough in a transparent displaying state. Therefore, when the see-through panel 1 is in the transparent displaying state, the viewer V1 is able to perceive a displayed image on the rear panel 2. Note that the see-through panel 1 is able to switch between an image displaying state and the transparent displaying state in a pixel by pixel manner, and can partially allow the background to be seen therethrough in a partial region in the panel plane.

The see-through panel 1 includes a liquid crystal layer 1L of TN (twisted nematic) type interposed between a pair of substrates. The TN-type liquid crystal layer 1L is arranged so that, in the absence of an applied voltage, a series of liquid crystal molecules along the substrate normal direction (the thickness direction of the liquid crystal layer 1L) constitute a twist angle of 90° between the pair of substrates.

Moreover, the see-through panel 1 includes a front-side polarizing plate and a rear-side polarizing plate, which are placed in crossed Nicols with the liquid crystal layer 1L interposed therebetween. The transmission axis (or the absorption axis) A1 of the front-side polarizing plate and the transmission axis (or the absorption axis) A2 of the rear-side polarizing plate are orthogonal. The see-through panel 1 of this construction may be driven by a field sequential method, for example. Under this method, multicolor displaying is performed by switching between colors of light to be radiated onto the see-through panel 1 through time division.

In the liquid crystal display device 100, the rear panel 2 also includes a TN-type liquid crystal layer 2L interposed between a pair of substrates. Similarly to the see-through panel 1, the rear panel 2 includes a front-side polarizing plate and a rear-side polarizing plate which are placed in crossed Nicols with the liquid crystal layer 2L interposed therebetween, such that the transmission axis (or the absorption axis) A3 of the front-side polarizing plate and the transmission axis (or the absorption axis) A4 of the rear-side polarizing plate are orthogonal.

Note that the aforementioned polarizing plates are placed so that the transmission axis A2 of the rear-side polarizing plate of the see-through panel 1 and the transmission axis A3 of the front-side polarizing plate of the rear panel 2 are parallel to each other, i.e., in parallel Nicols. As a result of this, a displayed image on the rear panel 2 is properly displayed to the viewer via the see-through panel 1. However, the polarizing plates may be placed so that the transmission axis A2 of the rear-side polarizing plate of the see-through panel 1 and the transmission axis A3 of the front-side polarizing plate of the rear panel 2 are at least non-orthogonal (i.e., not in crossed Nicols) when viewed from the panel-plane normal direction.

Figure 2:
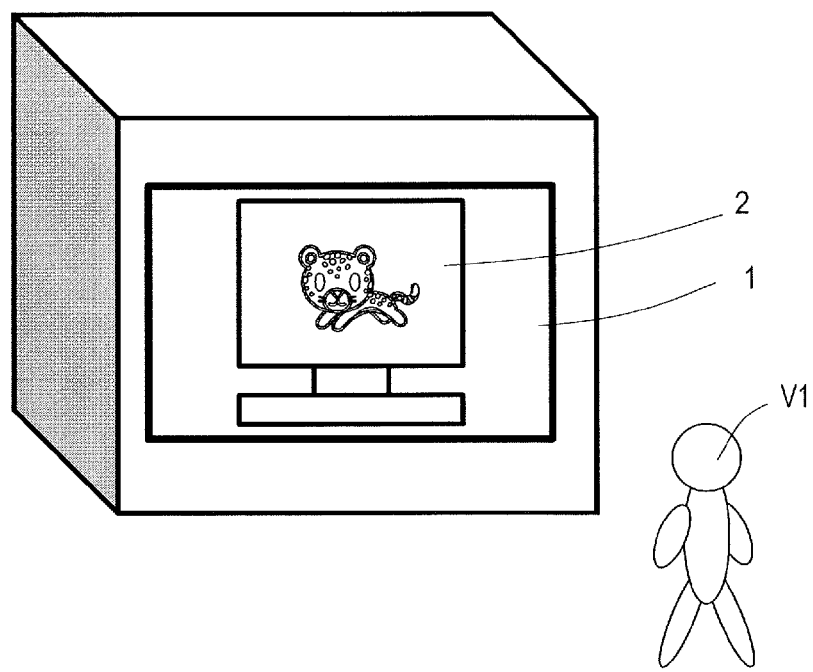
FIG. 2(a) is a diagram showing a displayed image when the polarization axes of polarizing plates of two display panels are in parallel Nicols; and (b) is a diagram showing a displayed image when the polarization axes of polarizing plates of two display panels are in crossed Nicols.
Figure 2:
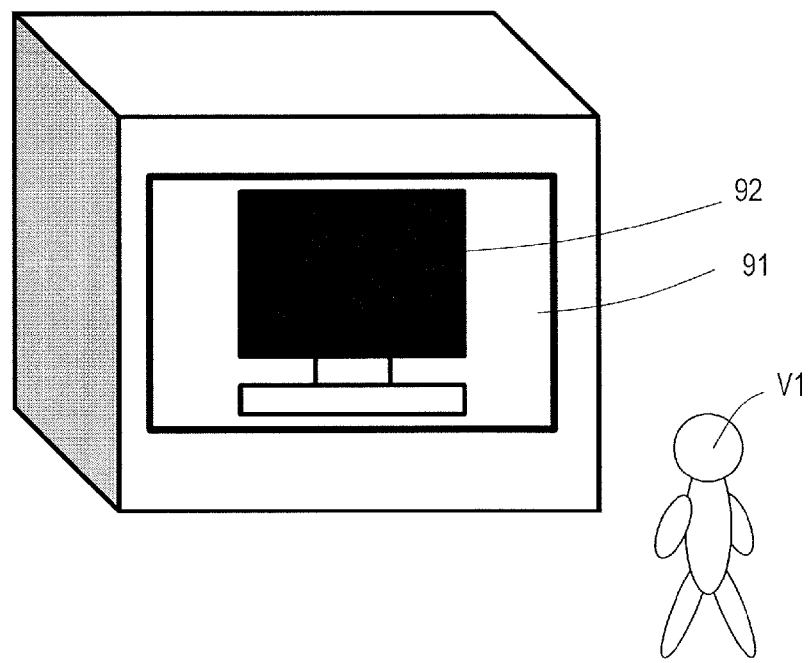

FIG. 2(a) is a diagram showing a displayed image in the case where the transmission axis A2 of the rear-side polarizing plate of the see-through panel 1 and the transmission axis A3 of the front-side polarizing plate of the rear panel 2 are under a parallel-Nicols relationship of being parallel. As can be seen from FIG. 2(a), in this case, display on the rear panel 2 is properly achieved via the see-through panel 1.

On the other hand, as shown in FIG. 2(b), when the transmission axis A2 of the rear-side polarizing plate of the see-through panel 1 and the transmission axis A3 of the front-side polarizing plate of the rear panel 2 are under a crossed-Nicols relationship of being orthogonal, display on the rear panel 92 is not properly achieved via the see-through panel 91. This is because polarized light which has been transmitted through the front-side polarizing plate of the rear panel 92 cannot transmit through the rear-side polarizing plate of the see-through panel 91.

Although the transmission axis A2 of the rear-side polarizing plate of the see-through panel 1 and the transmission axis A3 of the front-side polarizing plate of the rear panel 2 are preferably parallel as mentioned above, they may constitute an angle of 0° to 45° when viewed from the panel-plane normal direction. For example, when a TN mode liquid crystal display panel is used as the see-through panel 1 as will be described later, the transmission axis A2 of the rear-side polarizing plate is often set to an oblique direction of 45°, in order to take viewing angle characteristics into account. On the other hand, when a liquid crystal display panel of an VA mode or IPS mode is used as the rear panel 2, the transmission axis A3 of the front-side polarizing plate may possibly be set in the vertical direction. In such cases, too, although at a lower brightness than in the case where the aforementioned transmission axes are set parallel to each other, it is still possible to perform display. Therefore, the transmission axis A2 of the rear-side polarizing plate of the see-through panel 1 and the transmission axis A3 of the front-side polarizing plate of the rear panel 2 may be placed so as to constitute an angle of 0° to 45° when viewed from the panel-plane normal direction. However, in order to perform high-quality display, it is preferable that the transmission axis A2 of the rear-side polarizing plate of the see-through panel 1 and the transmission axis A3 of the front-side polarizing plate of the rear panel 2 are substantially parallel.

Now, a more specific construction of a liquid crystal display device in which a see-through panel and a rear panel including TN-type liquid crystal layers are placed so as to overlap will be described.

Figure 3:
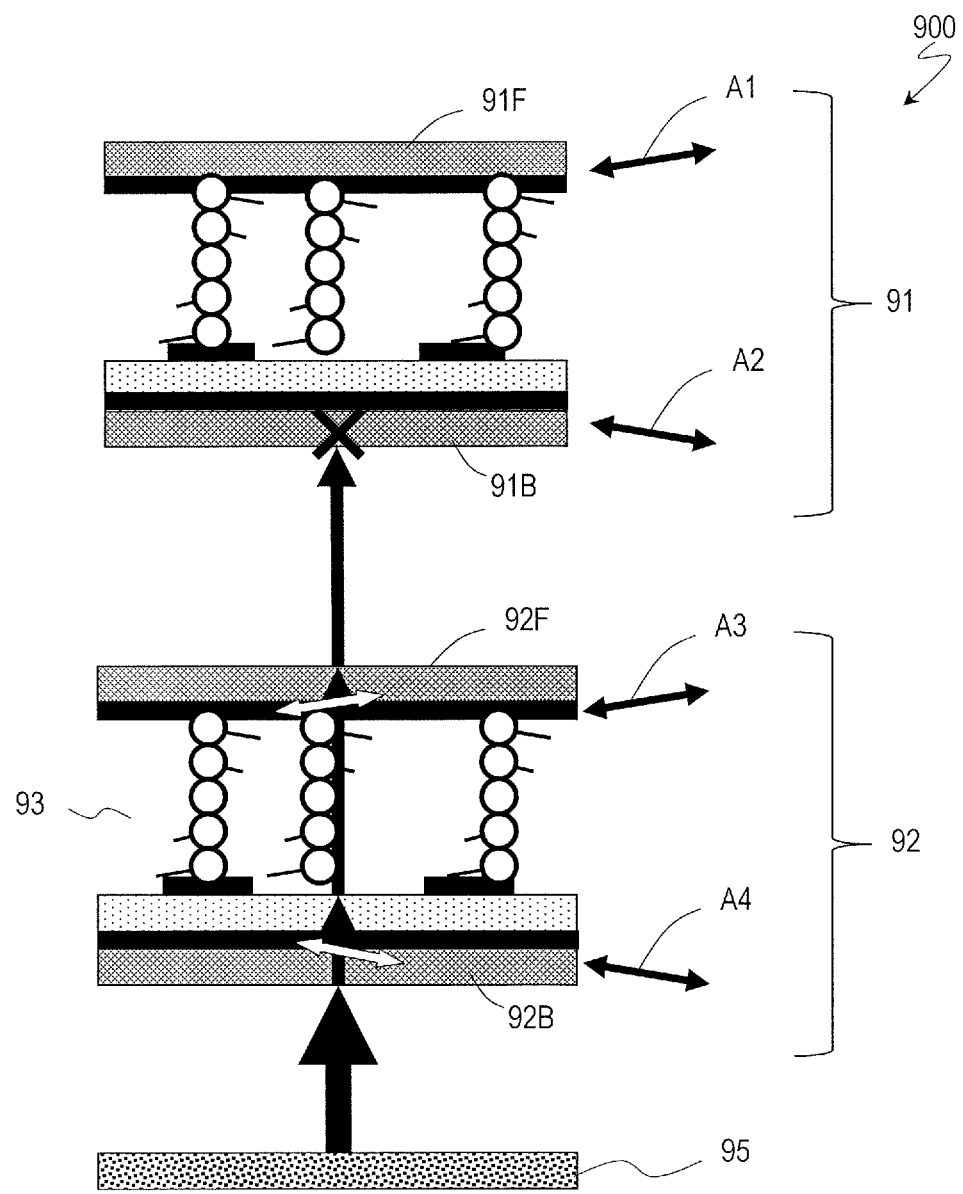
FIG. 3 A cross-sectional view showing a liquid crystal display device according to a comparative implementation.

FIG. 3 is a cross-sectional view showing the construction of a liquid crystal display device 900 of a comparative implementation, where the transmission axis A2 of the rear-side polarizing plate of the see-through panel 91 and the transmission axis A3 of the front-side polarizing plate of the rear panel 92 are placed in crossed Nicols, i.e., orthogonal.

As can be seen from FIG. 3, non-polarized light (unpolarized light) goes out from a light source 95 which is placed on the rear face side of the rear panel 92. This non-polarized light is incident on a rear-side polarizing plate 92B of the rear panel 92, and linearly polarized light (e.g., 45° polarized light) that has passed through the rear-side polarizing plate 92B is incident on a liquid crystal layer 93 of the rear panel 92. Then, the linearly polarized light incident on the liquid crystal layer 93 passes through the liquid crystal layer 93, which takes a twist alignment in a white displaying state (i.e., in the absence of an applied voltage), whereby its polarization plane is rotated by 90°. The light (e.g., −45° polarized light) whose polarization plane has changed at the liquid crystal layer 93 is able to pass through a front-side polarizing plate 92F.

At this time, if the transmission axis A2 of the rear-side polarizing plate 91B of the see-through panel 91 is orthogonal to the transmission axis A3 of the front-side polarizing plate 92F of the rear panel 92 as in the liquid crystal display device 900, polarized light going out from the rear panel 92 is absorbed by the rear-side polarizing plate 91B of the see-through panel 91, and thus is unable to pass therethrough. As a result, a displayed image on the rear panel 92 is not visible via the see-through panel 91.

Figure 4:
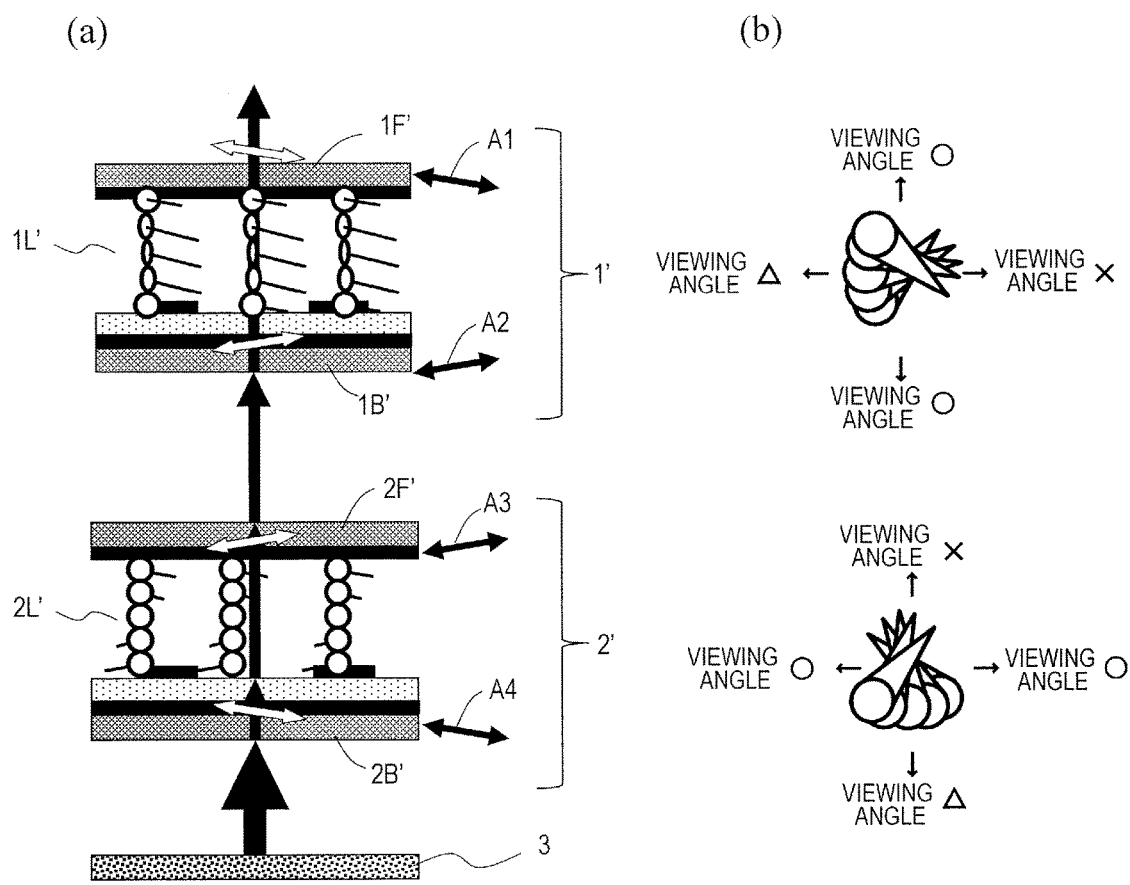
FIG. 4(a) is a cross-sectional view showing a liquid crystal display device of Embodiment 1; and (b) is a plan view showing an angular range for 90° twisted alignment in each panel.

Thus, as shown in FIG. 4(a), the transmission axis A2 of the rear-side polarizing plate 1B' of the see-through panel 1' and the transmission axis A3 of the front-side polarizing plate 2F' of the rear panel 2' might be placed in parallel. In this case, light from the light source 3 is modulated by the rear panel 2', and then, upon passing through the front-side polarizing plate 2F', goes out from the rear panel 2' as linearly polarized light. The polarized light going out from the rear panel 2' is able to pass through the rear-side polarizing plate 1B' of the see-through panel 1'. Therefore, the viewer is able to see a displayed image on the rear panel 2' via the see-through panel 1'. In this construction, too, the front-side polarizing plate 1F' and the rear-side polarizing plate 1B' of the see-through panel 1' are placed in crossed Nicols, whereas the front-side polarizing plate 2F' and the rear-side polarizing plate 2B' of the rear panel 2' are placed in crossed Nicols.

However, as shown in FIG. 4(b), given that the transmission axis A3 of the front-side polarizing plate 2F' of the rear panel 2' and the transmission axis A2 of the rear-side polarizing plate 1B' of the see-through panel 1' are placed in parallel, there may be cases where liquid crystal molecules in the respective TN-type liquid crystal layers 2L' and 1L' of the rear panel 2' and the see-through panel 1' differ in twist azimuths (described later). This is a problem that may occur when liquid crystal molecules in the respective liquid crystal layers 1L' and 2L' of the liquid crystal display panel 1' and 2' have an identical twist direction (whether clockwise (right-handed) or counterclockwise (left-handed)). Note that the aforementioned alignment direction may be set in a specific direction by applying a rubbing treatment or a photo-alignment treatment to alignment films.

More specifically, as shown in FIG. 4(b), in the liquid crystal layer 2L' of the rear panel 2', liquid crystal molecules are in a twist alignment along the thickness direction of the liquid crystal layer, from the lower-right oblique direction (in the direction of an azimuth angle of 315°, counterclockwise from the 3 o'clock direction defined as 0°) toward a lower-left oblique direction (in the direction of an azimuth angle of 225°). In this case, the polarization direction of linearly polarized light which is generated by the rear-side polarizing plate 2B' also undergoes a similar change as it passes through the liquid crystal layer 2L'. On the other hand, in the liquid crystal layer 1L' of the see-through panel 1', liquid crystal molecules are in a twist alignment from the lower-left oblique direction (in the direction of an azimuth angle of) 225° toward the upper-left oblique direction (in the direction of an azimuth angle of 135°). In this case, the polarization direction of linearly polarized light which is generated by the rear-side polarizing plate 1B' also undergoes a similar change as it passes through the liquid crystal layer 1L'.

The angular range of twist alignment of liquid crystal molecules as defined by the aforementioned azimuth angles may be referred to as a twist azimuth in the present specification. In the example shown in FIG. 4(b), the twist azimuth of the liquid crystal layer 1L' of the see-through panel 1' and the twist azimuth of the liquid crystal layer 2L' of the rear panel 2' differ by 90°.

When the twist azimuth of liquid crystal molecules differs between the panels 1' and 2', it is difficult to ensure that the direction of good viewing angle characteristics is identical between the panels 1' and 2'. With respect specifically to the above example, in the rear panel 2', the direction of good viewing angle characteristics is set to the right-left direction of the panel; but in the see-through panel 1', the direction of good viewing angle characteristics is set to the top-bottom direction of the panel. It is generally along the right-left direction that a liquid crystal panel allows itself to be observed with a wide viewing angle. For suitability with such a state of use, it is preferable that the display panel has good viewing angle characteristics along the right-left direction. However, in the above example, the viewing angle characteristics with respect to the right and left of the rear panel 2' may be good, but the viewing angle characteristics with respect to the right and left of the see-through panel 1' will not be good, so that the performance as a display device may be lowered. However, depending on the use, if it is not necessary for the direction of good viewing angle characteristics to be identical between the rear panel and the see-through panel, the construction shown in FIGS. 4(a) and (b) might be adopted.

FIG. 5(a) is a cross-sectional view showing a variant liquid crystal display device 100 from the liquid crystal display device shown in FIG. 4(a). The example shown in FIG. 5(a) attains an improved display quality by ensuring that the direction of good viewing angle characteristics is identical between the see-through panel and the rear panel.

The liquid crystal display device 100 includes: a see-through panel 1 which is placed on the viewer side; a rear panel 2 which is placed on the rear face side of the see-through panel 1; and a light source 3 which is placed on the rear face side of the rear panel 2.

In the liquid crystal display device 100, the see-through panel 1 includes a TFT substrate 4, a counter substrate 5, and a TN-type liquid crystal layer 1L interposed between the TFT substrate 4 and the counter substrate 5. The TN-type liquid crystal layer 1L is arranged so that, in the absence of an applied voltage, a series of liquid crystal molecules along the substrate normal direction constitute a twist angle of 90° between the substrates 4 and 5. Moreover, a horizontal alignment film not shown is provided on the liquid crystal layer 1L side of the TFT substrate 4, and a horizontal alignment film not shown is provided on the liquid crystal layer 1L side of the counter substrate 5. These alignment films have been subjected to an alignment treatment such as rubbing treatment or photo-alignment treatment, and the alignment direction (major-axis direction) of liquid crystal molecules which are in contact with each alignment film in the absence of an applied voltage is determined in accordance with the direction of the alignment treatment (direction of alignment regulation).

Moreover, the see-through panel 1 includes a front-side polarizing plate 1F and a rear-side polarizing plate 1B which are placed in crossed Nicols with the liquid crystal layer 1L interposed therebetween. Note that the transmission axis A1 of the front-side polarizing plate 1F and the transmission axis A2 of the rear-side polarizing plate 1B are orthogonal.

In the present embodiment, the direction of alignment regulation (e.g., rubbing direction) of the alignment film provided on the TFT substrate 4 and the direction of the transmission axis A2 of the rear-side polarizing plate 1B are set parallel. Moreover, the direction of alignment regulation of the alignment film provided on the counter substrate 5 and the direction of the transmission axis A1 of the front-side polarizing plate 1F are set parallel.

Moreover, the rear panel 2 includes a TFT substrate 6 and a counter substrate 7, with a TN-type liquid crystal layer 2L interposed between the TFT substrate 6 and the counter substrate 7. The rear panel 2 includes a front-side polarizing plate 2F and a rear-side polarizing plate 2B which are placed in crossed Nicols with the liquid crystal layer 2L interposed therebetween. Note that the transmission axis A3 of the front-side polarizing plate 2F and the transmission axis A4 of the rear-side polarizing plate 2B are orthogonal.

In the rear panel 2, the direction of alignment regulation of the alignment film provided on the TFT substrate 6 and the direction of the transmission axis A4 of the rear-side polarizing plate 2B are parallel. Moreover, the direction of alignment regulation of the alignment film provided on the counter substrate 7 and the direction of the transmission axis A3 of the front-side polarizing plate 2F are parallel.

In the liquid crystal display device 100, too, the transmission axis A3 of the front-side polarizing plate 2F of the rear panel 2 and the transmission axis A2 of the rear-side polarizing plate 1B of the see-through panel 1 are set parallel. This allows linearly polarized light going out from the rear panel 2 to pass through the see-through panel 1.

Now, the twist direction of liquid crystal molecules in the liquid crystal layer 2L of the rear panel 2 is counterclockwise, whereas the twist direction of liquid crystal molecules in the liquid crystal layer 1L of the see-through panel 1 is clockwise. In other words, the direction of twist alignment of liquid crystal molecules is opposite between the respective liquid crystal layers 1L and 2L of the panels 1 and 2.

Such a construction can be realized by allowing different chiral agents to be contained in the respective liquid crystal layers 1L and 2L, for example. Moreover, it is desirable to appropriately set a twist direction for each liquid crystal layer by properly selecting the direction of rubbing treatment for the alignment film, in a direction of ensuring that a 90° twisted alignment is attained such that the pretilt angle of liquid crystal molecules (i.e., the rising angle from the alignment film plane) is unlikely to vary along the thickness direction of the liquid crystal layer. Thus, by ensuring that the direction of the chiral agent and the rubbing direction (i.e., the rising direction of liquid crystal molecules) is identical, the alignment can be stabilized and high-quality display can be attained.

In this case, as shown in FIG. 5(b), the liquid crystal layer 2L of the rear panel 2 and the liquid crystal layer 1L of the see-through panel 1 attain similar twist azimuths of liquid crystal molecules. This permits the direction of good viewing angle characteristics to be the right-left direction in both panels 1 and 2 alike. As a result, display quality can be improved.

In a TN-type liquid crystal display device, it is often the case that a liquid crystal material having a left-handed chiral agent (i.e., a chiral agent that induces a left-handed twist alignment of liquid crystal molecules) mixed therein is used for the liquid crystal layer, in order to achieve a twist alignment; thus, US019 (manufactured by Merc & Co.) or the like has been used, for example. In the liquid crystal display device 100 of the present embodiment, a right-handed chiral agent (i.e., a chiral agent that induces a right-handed twist alignment of liquid crystal molecules) is used for the see-through panel 1, whereas a left-handed chiral agent is used for the rear panel 2. As a liquid crystal material containing a right-handed chiral agent, UR020 (manufactured by Merc & Co.) may be used, for example.

Apart from the above construction, a left-handed chiral agent may be used for the see-through panel 1, and a right-handed chiral agent may be used for the rear panel 2. In order to improve the viewing angle characteristics, it suffices if twist directions are opposite between the respective ones of two liquid crystal display panels which are placed so as to overlap.

As described above, given two TN-type liquid crystal display panels in adjacent placement, polarizing plates to be provided in between the respective liquid crystal layers of the liquid crystal display panels (i.e., a front-side polarizing plate of the rear panel and a rear-side polarizing plate of the see-through panel) may be placed so that their polarization axes are in parallel Nicols, and the directions of twist rotation of the respective liquid crystal layers of the display panels may be set opposite, whereby display on the rear panel can be properly performed while providing good viewing angle characteristics.

Hereinafter, an embodiment of a see-through panel and a rear panel to be driven by the field sequential method will be described in more detail. Although the construction of the see-through panel 1 will be described as a representative example, the rear panel 2 may also have a similar construction to that of the see-through panel 1. However, in another implementation, the rear panel 2 may have a construction such that, by using a white light source and RGB color filters, display is performed for each of RGB subpixels.

Figure 6:
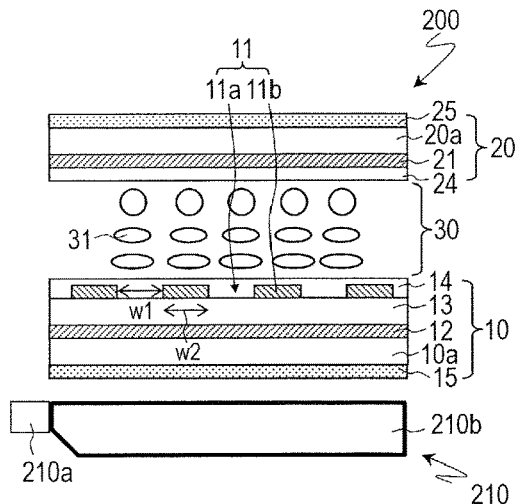
FIG. 6 A cross-sectional view schematically showing a liquid crystal display panel 200 according to an embodiment of the present invention.
Figure 7:
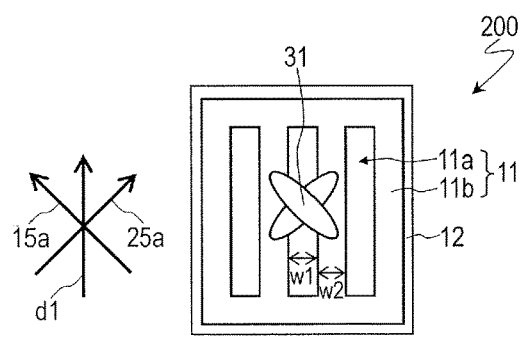
FIG. 7 A plan view schematically showing a liquid crystal display panel 200 according to an embodiment of the present invention.

FIG. 6 and FIG. 7 are a cross-sectional view and a plan view schematically showing the construction of a liquid crystal display panel (see-through panel) 200 and an illumination element 210 according to the present embodiment. The liquid crystal display panel 200 has a plurality of pixels arranged in a matrix, while FIG. 6 and FIG. 7 show a structure corresponding to one pixel.

The liquid crystal display panel 200 includes a TFT substrate (rear substrate) 10 and a counter substrate (front substrate) 20 which oppose each other, and a liquid crystal layer 30 interposed between the TFT substrate 10 and the counter substrate 20.

The TFT substrate 10 includes a first electrode 11 provided for each of the plurality of pixels and a second electrode 12 which cooperates with the first electrode 11 to generate a lateral field across the liquid crystal layer 30. Via an insulating layer 13, the first electrode 11 is located on the second electrode 12. Stated otherwise, the second electrode 12 is located under the first electrode 11 via the insulating layer 13. Hereinafter, between the first electrode 11 and the second electrode 12, the first electrode 11 taking a relatively upper position will be referred to as the "upper electrode", and the second electrode 12 taking a relatively lower position will be referred to as the "lower electrode". The lower electrode 12, insulating layer 13, and the upper electrode 11 are supported by an insulative transparent substrate (e.g., a glass substrate) 10a.

As shown in FIG. 6 and FIG. 7, the upper electrode includes a plurality of slits 11a extending along a predetermined direction dl, and a plurality of branches 11b extending in parallel to the direction dl that the slits 11a extend. Note that the number of slits 11a and the number of branches 11b are not limited to those exemplified in FIG. 6 and FIG. 7. There is no particular limitation as to the width w1 of the slits 11a. The width w1 of the slits 11a is typically not less than 2 µm and not more than 10 µm. There is no particular limitation as to the width w2 of the branches 11b, either. The width w2 of the branches 11b is typically not less than 2 µm and not more than 10 µm. The upper electrode 11 is made of a transparent electrically conductive material (e.g., ITO).

The lower electrode 12 has no slits. That is, the lower electrode 12 is a so-called spread electrode. The lower electrode 12 is also made of a transparent electrically conductive material (e.g., ITO).

There is no particular limitation as to the material of the insulating layer 13. As the material of the insulating layer 13, for example, an inorganic material such as silicon oxide ($SiO_2$) or silicon nitride (SiNx), or an organic material such as a photo-sensitive resin can be used.

The counter substrate 20 includes a third electrode (hereinafter referred to as the "counter electrode") 21 which opposes the upper electrode 11 and the lower electrode 12. The counter electrode 21 is supported by an insulative transparent substrate (e.g., a glass substrate) 20a.

The counter electrode 21 generates a vertical field across the liquid crystal layer 30 in cooperation with the upper electrode 11 and the lower electrode 12. The counter electrode 21 is made of a transparent electrically conductive material (e.g., ITO).

The liquid crystal layer 30 contains liquid crystal molecules 31 having positive dielectric anisotropy. In other words, the liquid crystal layer 30 is made of a positive type liquid crystal material. Note that the orientation directions of the liquid crystal molecules 31 shown in FIG. 6 and FIG. 7 are those in a state where no voltage is applied to the liquid crystal layer 30.

The liquid crystal display panel 200 further includes a pair of horizontal alignment films 14 and 24 which oppose each other via the liquid crystal layer 30. One (which hereinafter may be referred to as the "first horizontal alignment film") 14 of the pair of horizontal alignment films 14 and 24 is formed on a surface of the rear substrate 10 that faces the liquid crystal layer 30. The other (which hereinafter may be referred to as the "second horizontal alignment film") 24 of the pair of horizontal alignment films 14 and 24 is formed on a surface of the front substrate 20 that faces the liquid crystal layer 30.

The first horizontal alignment film 14 and the second horizontal alignment film 24 have each been subjected to an alignment treatment, thus possessing an alignment regulating force that causes the liquid crystal molecules 31 in the liquid crystal layer 30 to be aligned in a predetermined direction (called a "pretilt direction"). As the alignment treatment, for example, a rubbing treatment or a photo-alignment treatment is conducted. The first horizontal alignment film 14 and the second horizontal alignment film 24 exert alignment regulating forces so that the liquid crystal molecules 31 will take a twist alignment in a state where no voltage is applied to the liquid crystal layer 30 (i.e., a state where no electric field is generated). The direction of alignment regulation of the first horizontal alignment film 14 and the direction of alignment regulation of the second horizontal alignment film differ by 90° as viewed from the panel-plane normal direction.

More specifically, the pretilt direction defined by each of the first horizontal alignment film 14 and the second horizontal alignment film 24 constitutes an angle of substantially 45° with the direction dl that the slits 11a of the upper electrode 11 extend. Moreover, the pretilt direction that is defined by the second horizontal alignment film 24 constitutes an angle of 90° with the pretilt direction that is defined by the first horizontal alignment film 14. Therefore, in a state where no voltage is applied to the liquid crystal layer 30, the liquid crystal molecules 31 take a 90° twisted alignment.

Moreover, the liquid crystal display panel 200 further includes a pair of polarizing plates 15 and 25 which oppose each other via the liquid crystal layer 30. A transmission axis 15a of one (which hereinafter may be referred to as the "first polarizing plate") 15 of the pair of polarizing plates 15 and 25 is substantially orthogonal to a transmission axis (polarization axis) 25a of the other (which hereinafter may be referred to as the "second polarizing plate") 25, as shown in FIG. 7. In other words, the first polarizing plate 15 and the second polarizing plate 25 are placed in crossed Nicols.

The respective transmission axes 15a and 25a of the first polarizing plate 15 and the second polarizing plate 25 are substantially parallel or substantially orthogonal to the pretilt directions which are respectively defined by the first horizontal alignment film 14 and the second horizontal alignment film 24. Therefore, the respective transmission axes 15a and 25a of the first polarizing plate 15 and the second polarizing plate 25 constitute angles of substantially 45° with respect to the direction dl that the slits 11a of the upper electrode 11 extend.

The illumination element (referred to as the "backlight") 210 is located on the rear face side of the liquid crystal display panel 200. The illumination element 210 is able to switchably irradiate the liquid crystal display panel 200 with a plurality of color rays including red light, green light, and blue light.

As the illumination element 210, for example, an edgelight-type backlight such as that shown in FIG. 6 can be used. The edgelight-type backlight 210 includes a light source unit 210a and a light guide plate 210b. The light source unit 210a is capable of emitting a plurality of color rays including red light, green light, and blue light. For example, the light source unit 210a includes a red LED, a green LED, and a blue LED. The light guide plate 210b guides color rays which are emitted from the light source unit 210a to the liquid crystal display panel 200.

The liquid crystal display panel 200 and the illumination element 210 of this construction perform multicolor displaying by the field sequential method. Therefore, the liquid crystal display panel 1 lacks color filters. Under the field sequential method, each pixel is given a red light displaying period, a green light displaying period, and a blue light displaying period with no temporal overlaps. Therefore, as compared to a generic display device which includes red (R), green (G), and blue (B) color filters (i.e., R subpixels, G subpixels, B subpixels) and simultaneously displays the three colors, the pixel driving frequency needs to be e.g. tripled under the field sequential method, in order to attain the same frequency of rewriting for a color image.

In the liquid crystal display panel 200 of this construction, when a predetermined voltage is applied between the upper electrode 11 and the lower electrode 12 (i.e., a predetermined potential difference is introduced therebetween), a lateral field (fringing field) is generated across the liquid crystal layer 30. A "lateral field" is an electric field containing a component which is substantially parallel to the substrate plane. The direction of the lateral field which is generated by the upper electrode 11 and the lower electrode 12 is substantially orthogonal to the direction dl that the slits 11a of the upper electrode 11 extend.

On the other hand, when a predetermined voltage is applied between the counter electrode 21 and the upper electrode 11 and lower electrode 12 (i.e., a predetermined potential difference is introduced therebetween), a vertical field is generated. A "vertical field" is an electric field whose direction is substantially parallel to the substrate-plane normal direction.

The liquid crystal panel 200 is constructed so that the intensities of the lateral field and the vertical field can be controlled with respect to each pixel. Typically, a liquid crystal display device is constructed so that a voltage differing from pixel to pixel can be respectively supplied for the upper electrode 11 and the lower electrode 12. Specifically, both the upper electrode 11 and the lower electrode 12 are formed in isolated pieces corresponding to pixels, such that each pixel has a switching element (e.g., a thin film transistor; not shown) electrically connected to the upper electrode 11 and a switching element (e.g., a thin film transistor; not shown) electrically connected to the lower electrode 12. A predetermined voltage is supplied to each of the upper electrode 11 and the lower electrode 12 via a corresponding switching element. Moreover, the counter electrode 21 is formed as a single electrically conductive film that is continuous across all pixels. Therefore, a common potential is applied to the counter electrode 21 for all pixels.

Figure 8:
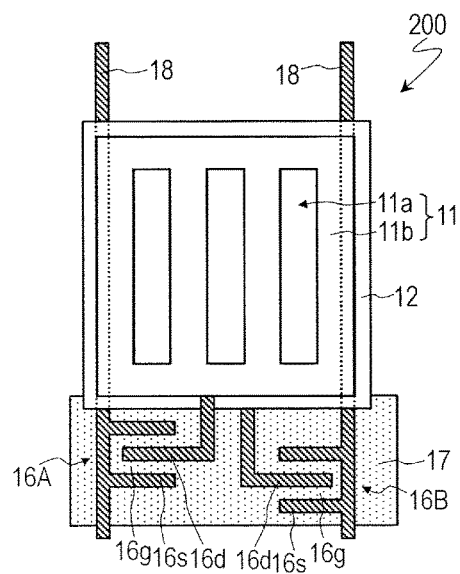
FIG. 8 A plan view schematically showing a liquid crystal display panel 200 according to an embodiment of the present invention.

FIG. 8 shows an exemplary of a specific wiring structure for the rear substrate 10. In the construction shown in FIG. 8, a first TFT 16A corresponding to the upper electrode 11 and a second TFT 16B corresponding to the lower electrode 12 are provided for each pixel.

The respective gate electrodes 16g of the first TFT 16A and the second TFT 16B are electrically connected to a gate bus line (scanning line) 17. Herein, the portions of the gate bus line 17 that overlap the channel regions of the first TFT 16A and the second TFT 16B function as the gate electrodes 16g. Respective source electrodes 16s of the first TFT 16A and the second TFT 16B are electrically connected to source bus lines (signal lines) 18. Herein, portions branching out from the source bus lines 18 function as the source electrodes 16s. A drain electrode 16d of the first TFT 16A is electrically connected to the upper electrode 11. On the other hand, a drain electrode 16d of the second TFT 16B is electrically connected to the lower electrode 12. Note that the wiring structure of the rear substrate 10 is not limited to what is exemplified in FIG. 8.

In the liquid crystal display panel 200 of the present embodiment, each of the plurality of pixels is able to switchably present: a "black displaying state", where black displaying is performed with a vertical field being generated across the liquid crystal layer 30; a "white displaying state", where white displaying is performed with a lateral field being generated across the liquid crystal layer 30; or a "transparent displaying state", where the rear face side (i.e., the background) of the liquid crystal display panel 200 is visible in a see-through manner with no voltage being applied to the liquid crystal layer 30.

Figure 9:
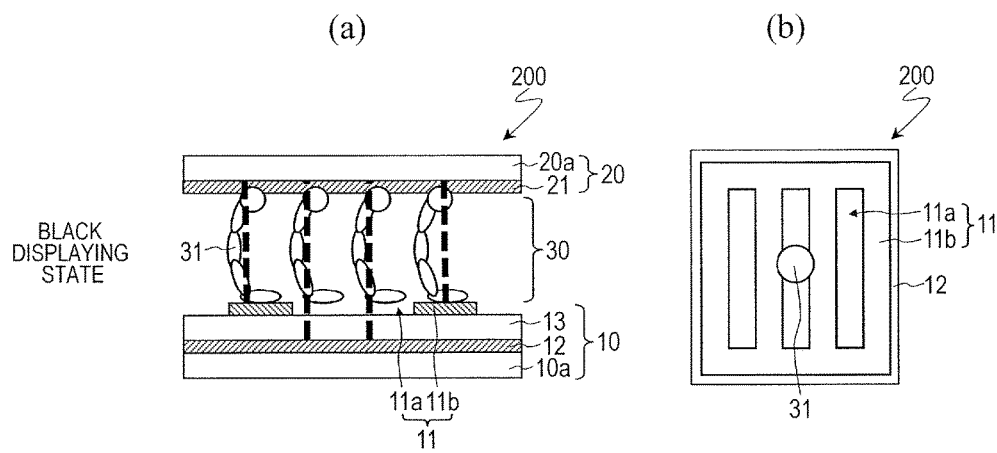
FIGS. 9(a) and (b) are a cross-sectional view and a plan view showing an alignment of liquid crystal molecules 31 in a black displaying state of the liquid crystal display panel 200.
Figure 10:
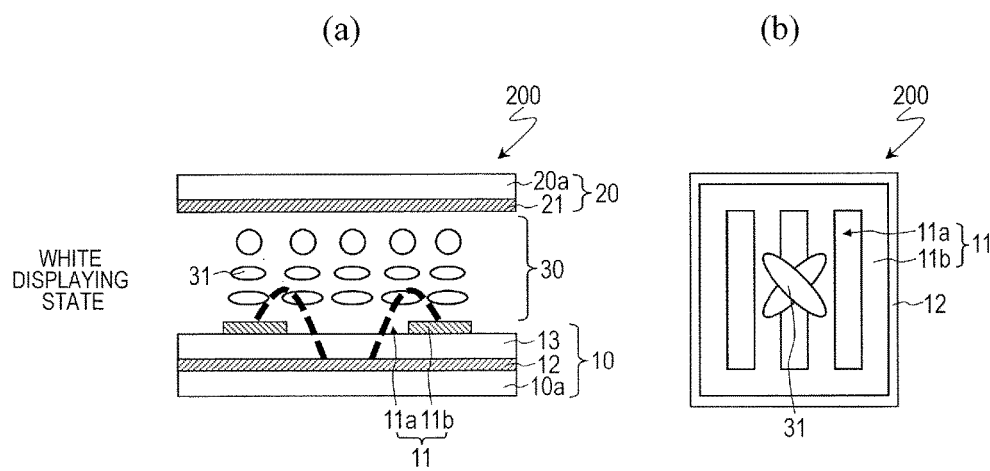
FIGS. 10(a) and (b) are a cross-sectional view and a plan view showing an alignment of liquid crystal molecules 31 in a white displaying state of the liquid crystal display panel 200.
Figure 11:
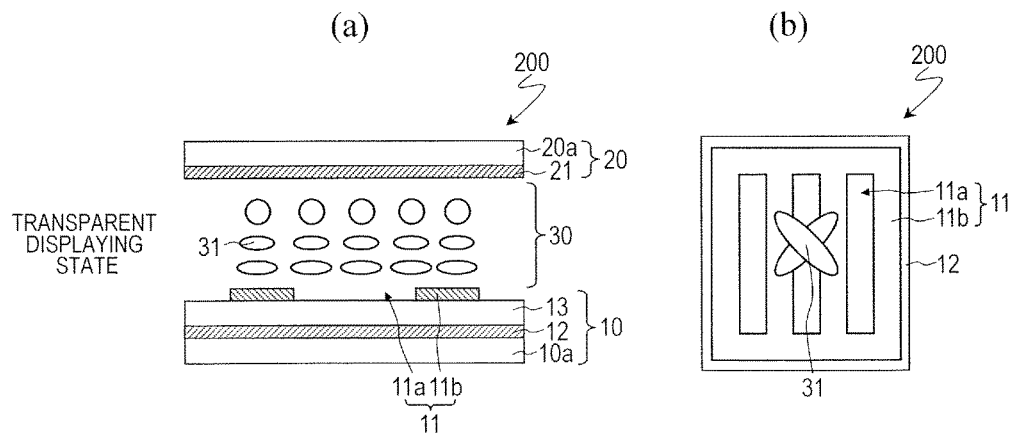
FIGS. 11(a) and (b) are a cross-sectional view and a plan view showing an alignment of liquid crystal molecules 31 in a transparent displaying state of the liquid crystal display panel 200.

Hereinafter, with reference to FIG. 9, FIG. 10 and FIG. 11, the black displaying state, the white displaying state, and the transparent displaying state will be described in more detail.

FIGS. 9(a) and (b) show an alignment of liquid crystal molecules 31 in a black displaying state. In the black displaying state, a predetermined voltage is applied between the counter electrode 21 and the upper electrode 11 and lower electrode 12 (e.g., a potential of 0 V being given to the counter electrode 21 and a potential of 7.5 V being given to the upper electrode 11 and lower electrode 12), whereby a vertical field is generated across the liquid crystal layer 30. FIG. 9(a) schematically shows the electric lines of force in this state with broken lines.

In this black displaying state, as shown in FIGS. 9(a) and (b), the liquid crystal molecules 31 in the liquid crystal layer 30 are aligned substantially vertically to the substrate plane (the surfaces of the rear substrate 10 and the front substrate 20)(i.e., substantially parallel to the layer normal direction of the liquid crystal layer 30). Note that the liquid crystal molecules 31 in the close neighborhood of the first horizontal alignment film 14 and the second horizontal alignment film 24 are strongly affected by the alignment regulating forces of the first horizontal alignment film 14 and the second horizontal alignment film 24, and therefore remain aligned substantially parallel to the substrate plane. However, since these liquid crystal molecules 31 are substantially parallel or substantially orthogonal to the transmission axis 15a of the first polarizing plate 15, they hardly confer any phase difference to the light passing through the first polarizing plate 15 and entering the liquid crystal layer 30, and thus hardly lower the contrast ratio.

FIGS. 10(a) and (b) show an alignment of liquid crystal molecules 31 in the white displaying state. In the white displaying state, a predetermined voltage is applied between the upper electrode 11 and the lower electrode 12 (e.g., a potential of 0 V being given to the upper electrode 11 and the counter electrode 21, and a potential of 7.5 V being given to the lower electrode 12), thereby generating a lateral field (fringing field) across the liquid crystal layer 30. FIG. 10(a) schematically shows the electric lines of force in this state with broken lines.

In this white displaying state, as shown in FIGS. 10(a) and (b), the liquid crystal molecules 31 in the liquid crystal layer 30 are aligned substantially in parallel to the substrate plane (i.e., substantially vertically to the layer normal direction of the liquid crystal layer 30). More specifically, the liquid crystal molecules 31 in the neighborhood of first horizontal alignment film 14 and the liquid crystal molecules 31 in the neighborhood of second horizontal alignment film 24 are aligned so as to constitute an angle of substantially 90°, whereby the liquid crystal molecules 31 near the center along the thickness direction of the liquid crystal layer 30 are aligned substantially parallel to the direction dl that the slits 11a of the upper electrode 11 extend. Therefore, an average orientation direction of the bulk liquid crystal is substantially parallel to the direction dl that the slits 11a extend (i.e., constituting an angle of substantially 45° with respect to the respective transmission axes 15a and 25a of the first polarizing plate 15 and the second polarizing plate 25).

FIGS. 11(a) and (b) show an alignment of liquid crystal molecules 31 in the transparent displaying state. In the transparent displaying state, no voltage is applied to the liquid crystal layer 30 (e.g., a potential of 0 V is given to all of the upper electrode 11, the lower electrode 12, and the counter electrode 21), so that neither a vertical field nor a lateral field is generated across the liquid crystal layer 30.

In this transparent displaying state, the liquid crystal molecules 31 in the liquid crystal layer 30 take a twist alignment, as shown in FIGS. 11(a) and (b). In other words, the liquid crystal molecules 31 are aligned substantially in parallel to the substrate plane (i.e., substantially vertically to the layer normal direction of the liquid crystal layer 30). The liquid crystal molecules 31 in the neighborhood of first horizontal alignment film 14 and the liquid crystal molecules 31 in the neighborhood of second horizontal alignment film 24 are aligned so as to constitute an angle of substantially 90°, whereby the liquid crystal molecules 31 near the center along the thickness direction of the liquid crystal layer 30 are aligned substantially parallel to the direction dl that the slits 11a of the upper electrode 11 extend. Therefore, an average orientation direction of the liquid crystal molecules 31 in the bulk liquid crystal are substantially parallel to the direction dl that the slits 11a extend (i.e., constituting an angle of substantially 45° with respect to the respective transmission axes 15a and 25a of the first polarizing plate 15 and the second polarizing plate 25). The light transmittance of each pixel of the liquid crystal display panel 200 is the highest in this transparent displaying state (i.e., higher than those in the black displaying state and the white displaying state).

As described above, in the liquid crystal display panel 200 of the present embodiment, a vertical field is generated across the liquid crystal layer 30 in the black displaying state and a lateral field is generated across the liquid crystal layer 30 in the white displaying state; therefore, torque due to voltage application can act on the liquid crystal molecules 31 in both a fall (i.e., a transition from the white displaying state to the black displaying state) and a rise (i.e., a transition from the black displaying state to the white displaying state). As a result, good response characteristics are attained.

Furthermore, in the liquid crystal display panel 200 of the present embodiment, each pixel is capable of presenting not only the black displaying state and the white displaying state, but also the transparent displaying state, which is a state where no voltage is applied to the liquid crystal layer 30. By displaying the background in this transparent displaying state, it becomes possible to improve the quality of see-through displaying. As described above, the liquid crystal display panel 200 of the present embodiment excels in both response characteristics and display quality, and thus is suitably used as a see-through display.

Note that each of the plurality of pixels of the liquid crystal display panel 200 is able to present an "intermediate level displaying state" of presenting a luminance corresponding to an intermediate gray scale level, in addition to the black displaying state of presenting a luminance corresponding to the lowest gray scale level, the white displaying state of presenting a luminance corresponding to the highest gray scale level, and the transparent displaying state of conducting see-through displaying. In an intermediate level displaying state, desired transmittance can be realized by adjusting the intensity of the lateral field (fringing field) to be generated across the liquid crystal layer 30 (e.g., a potential of 0 V being given to the counter electrode 21 and that of 7.5 V being given to the lower electrode 12, and a potential which is greater than 0 V and less than 7.5 V being given to the upper electrode 11). It will be appreciated that the relationship between the potentials to be given to the upper electrode 11 and the lower electrode 12 is not limited to what is exemplified herein. For example, intermediate level displaying may be realized with a fixed potential given to the upper electrode 11 and a variable potential given to the lower electrode 12.

Moreover, in the present embodiment, liquid crystal molecules 31 in the liquid crystal layer 30 take a twist alignment in the transparent displaying state. This allows a more vivid (clearer) transparent displaying to be realized. Under a twist alignment, the liquid crystal molecules 31 are oriented in an identical direction within a plane which is parallel to the display surface; therefore, any diffraction associated with refractive index differences within the plane, or any diffraction associated with dark lines ascribable to the liquid crystal mode does not occur.

When conducting displaying such that information which is displayed by the liquid crystal display panel 200 is overlaid on the background, the pixels in the portion of the displaying region where information is to be displayed present either the black displaying state, the white displaying state, or an intermediate level displaying state, whereas the pixels in any other portion present the transparent displaying state. These displaying states can be switched in the following manner, for example.

A driving circuit for a generic liquid crystal display device includes an 8-bit driver IC, and generates output voltages corresponding to 256 gray scale levels ($0^{th}$ to $255^{th}$ gray scale levels). In a generic liquid crystal display device, the $0^{th}$ gray scale level is assigned to the black displaying state; the $1^{st}$ to $254^{th}$ gray scale levels are assigned to intermediate level displaying states; and the $255^{th}$ gray scale level is assigned to the white displaying state.

In the liquid crystal display panel 200 of the present embodiment, for example, the $0^{th}$ gray scale level may be assigned to the transparent displaying state, the $1^{st}$ gray scale level may be assigned to the black displaying state, the $2^{nd}$ to $254^{th}$ gray scale levels may be assigned to intermediate level displaying states, and the $255^{th}$ gray scale level assigned to the white displaying state, thereby being able to switch between the black displaying state, intermediate level displaying states, the white displaying state, and the transparent displaying state. Note that it is not necessary for the transparent displaying state to be associated with the $0^{th}$ gray scale level, and any gray scale level may be assigned to the transparent displaying state. In cases other than displaying in 256 gray scale levels exemplified herein, too, a specific gray scale level may be assigned to the transparent displaying state.

As described above, in the liquid crystal display panel 200 of the present embodiment, each pixel is capable of switchably presenting the black displaying state, the white displaying state, or the transparent displaying state. In any conventional see-through display, regardless of its type (liquid crystal display device, PDLC display, organic EL display, etc.), see-through displaying will need to be performed in either the black displaying state or the white displaying state (i.e., the gray scale level for either the black displaying state or the white displaying state being assigned to see-through displaying), and thus see-through displaying cannot be performed with an applied voltage that differs from those of the black displaying state and the white displaying state. On the other hand, in the liquid crystal display panel 200 of the present embodiment, each pixel is able to present not only the black displaying state and the white displaying state, but also the transparent displaying state, with an applied voltage which differs from those of the black displaying state and the white displaying state. In particular, since the transparent displaying state is realized in a state where no voltage is being applied to the liquid crystal layer, a distribution of refractive indices is prevented from occurring within the pixel in the transparent displaying state. This prevents scattering of light due to refractive index distribution, thereby preventing a viewer who is observing the background via the see-through display from perceiving the background as double images.

Thus, the liquid crystal display device according to Embodiment 1 has been described, but it will be appreciated that various modifications are possible. For example, although a liquid crystal display device including one see-through panel and one rear panel is described above, this is not a limitation, and more liquid crystal display panels may be used.

Figure 12:
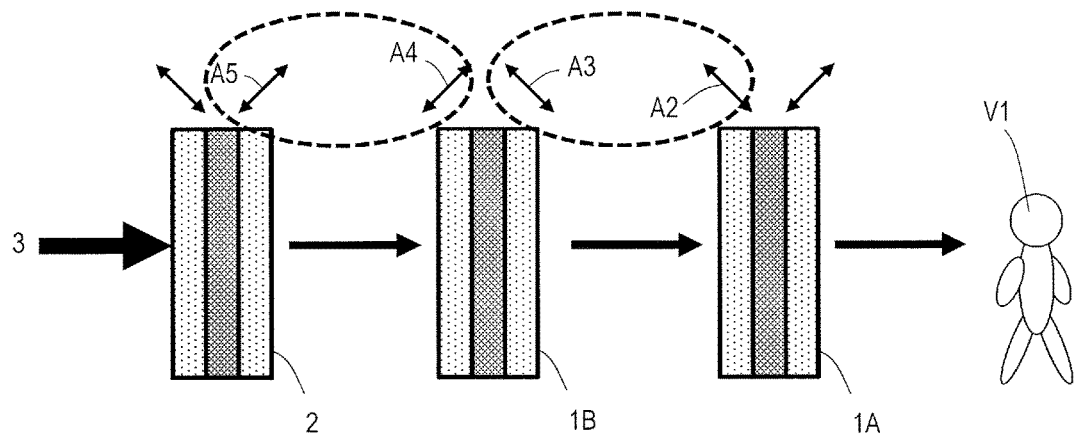
FIG. 12 A side view showing another implementation according to Embodiment 1 of the present invention.

FIG. 12 shows an implementation where a first see-through panel 1A and a second see-through panel 1B are placed frontward of the rear panel 2. The first see-through panel 1A, the second see-through panel 1B, and the rear panel 2 are placed so as to at least partially overlap as viewed from the viewer V1.

Thus, also in the case where three or more liquid crystal display panels are used, the transmission axes of two opposing polarizing plates of two adjacent liquid crystal display panels are placed in parallel Nicols, i.e., being parallel. In other words, in the example shown in FIG. 12, the transmission axis (or the absorption axis) A5 of the front-side polarizing plate of the rear panel 2 and the transmission axis (or the absorption axis) A4 of the rear-side polarizing plate of the second see-through panel 1B, which is placed frontward of the rear panel 2, are placed in parallel. Moreover, the transmission axis (or the absorption axis) A3 of the front-side polarizing plate of the second see-through panel 1B and the transmission axis (or the absorption axis) A2 of the rear-side polarizing plate of the first see-through panel 1A, which is placed frontward of the second see-through panel 1B, are placed in parallel.

In this construction, in order to improve the viewing angle characteristics, it is preferable that the twist direction in the rear panel 2 and the twist direction in the first see-through panel 1A are identical, but that the twist direction in the second see-through panel 1B is opposite. For example, a left-handed chiral agent may be used for the liquid crystal layers of the rear panel 2 and the first see-through panel 1A to achieve a counterclockwise twist alignment, while a right-handed chiral agent may be used for the liquid crystal layer of the second see-through panel 1B to achieve a clockwise twist alignment. Alternatively, a right-handed chiral agent may be used for the liquid crystal layers of the rear panel 2 and the first see-through panel 1A, while a left-handed chiral agent may be used for the liquid crystal layer of the second see-through panel 1B.

Moreover, in this case of placing a plurality of (especially three or more) liquid crystal display panels so as to overlap, it is preferable that each liquid crystal display panel has a high transmittance. To this end, as has been described above, it is desirable to perform multicolor displaying by the field sequential method, without color filters being provided for each liquid crystal display panel. Thus, even by using a plurality of liquid crystal display panels, display with a high display quality can be achieved with good transmittance. Therefore, video images with unprecedented realism can be provided with high quality, e.g., by presenting video images with an enhanced stereoscopic effect to the viewer.

Embodiment 2

Figure 5:
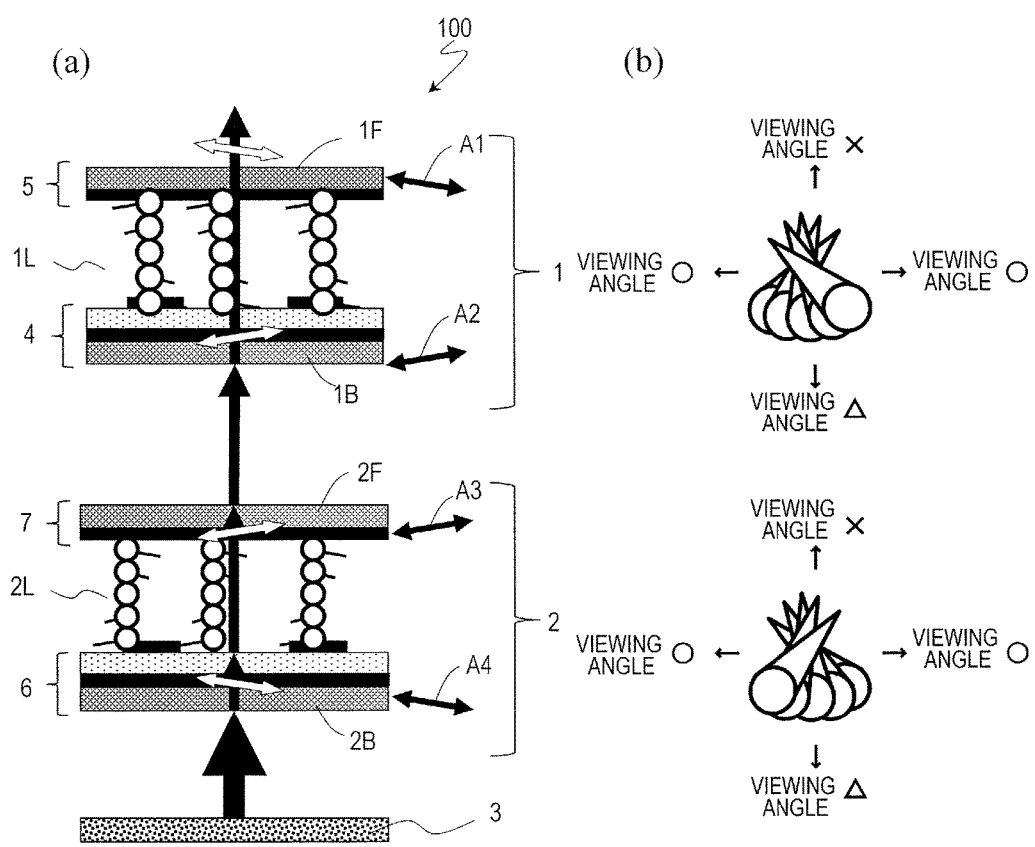
FIG. 5(a) is a cross-sectional view showing a liquid crystal display device according to a variant embodiment; and (b) is a plan view showing an angular range for 90° twisted alignment in each panel.

As a display device according to Embodiment 2, an implementation will be described in which both a see-through panel 1 and a rear panel 2 as shown in FIG. 1, FIG. 5, and so on are driven by the field sequential method, and a red light displaying period, a green light displaying period, and a blue light displaying period are synchronized between the see-through panel 1 and the rear panel 2.

Figure 13:
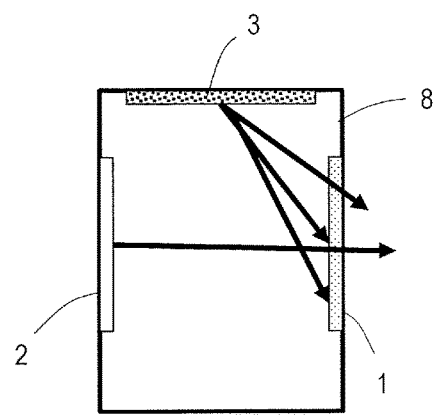
FIG. 13 A cross-sectional view showing a construction for a liquid crystal display device according to Embodiment 2 of the present invention.

As shown in FIG. 13, in the liquid crystal display device of the present embodiment, the see-through panel 1 is installed on a side face of a box-shaped case 8. Moreover, a light source 3 is installed inside the case 8, e.g. on the ceiling. The light source 3 is able to irradiate the see-through panel 1 with red light, green light, and blue light, these being switched through time division. In order to allow as much light from the light source 3 as possible to be incident on the see-through panel 1, the inner surface of the case 8 may have a light diffusing property.

In the case 8, the rear panel 2 is installed on the rear face side of the see-through panel 1. The see-through panel 1 and the rear panel 2 are placed so as to overlap, typically as viewed from the front side. In this construction, an image which is displayed by the rear panel 2 is to be viewed via the see-through panel 1.

In the present embodiment, too, the polarizing plates are placed so that the transmission axis of the front-side polarizing plate of the rear panel 2 and the transmission axis of the rear-side polarizing plate of the see-through panel 1 are parallel. As a result, a displayed image on the rear panel 2 will be properly perceived through the see-through panel 1.

In the present embodiment, the rear panel 2 is also driven by the field sequential method. For example, the aforementioned light source 3 for the see-through panel 1 may also double as a light source for the rear panel 2. Moreover, when using the light source 3 installed on the ceiling of the case 8 as shown in FIG. 13, the rear panel 2 may be a reflection-type liquid crystal display panel that performs display by modulating incident light from the panel front face. In the case where a reflection-type liquid crystal display panel is used as the rear panel 2, the rear panel 2 may only have a front-side polarizing plate, and not a rear-side polarizing plate.

Without being limited to the construction shown in FIG. 13, a light source for field sequential driving may be additionally provided on the rear face side of the transmission-type rear panel 2. In this case, however, the additionally-provided light source for the rear panel 2 and the light source 3 for the see-through panel 1 are to be synchronized so as to emit a ray of the same color at the same point in time. Although the cycle and period with which to emit each color ray do not need to be identical between both light sources, synchronization is to be ensured so that at least different color rays will not be simultaneously being emitted by one light source and the other light source.

FIG. 14(a) shows irradiation timing of red light R, green light G, and blue light B by the rear panel 2 shown in FIG. 13, and response D2 (transmittance) of the rear panel 2. FIG. 14(b) shows irradiation timing of red light R, green light G, and blue light B by the see-through panel 1, and response D1 (transmittance) of the see-through panel 1. In the graph, the horizontal axis represents time t.

As can be seen from FIGS. 14(a) and (b), this example will illustrate a case where the rear panel 2 performs white displaying by allowing all of red light R, green light G, and blue light B to be transmitted, while the see-through panel 1 performs red displaying by selectively allowing red light R to be transmitted.

When both of the see-through panel 1 and the rear panel 2 are driven by the field sequential method, as shown in FIGS. 14(a) and (b), it is possible to synchronize the displaying period of red light R, the displaying period of green light G, and the displaying period of blue light B between the rear panel 2 and the see-through panel 1. Thus, so long as the displaying periods of the respective colors are synchronized, display with high color purity can be achieved even when display is conducted differently, e.g., white being displayed by the rear panel and red being displayed by the see-through panel.

Figure 14:
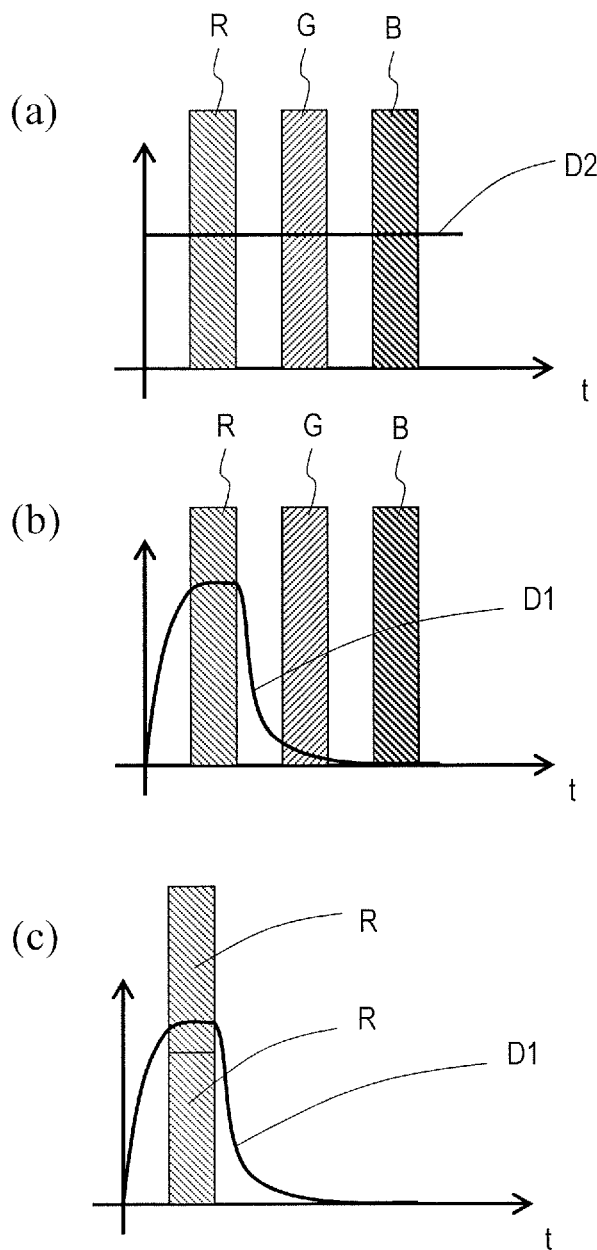
FIG. 14 A diagram showing displaying periods of RGB light and states of transmittance of the liquid crystal layer under a field sequential method according to Embodiment 2 of the present invention, where (a) illustrates a state of a rear panel; (b) illustrates a state of a see-through panel; and (c)

Specifically, as shown in FIG. 14(*a*), to perform white displaying, the rear panel 2 allows light of each color to be transmitted throughout the red light displaying period, the green light displaying period, and the blue light displaying period. However, in the red light displaying period of the see-through panel 1, the rear panel 2 under synchronization also is displaying red light. Consequently, as shown in FIG. 14(*c*), the display on the see-through panel 1 to be observed (i.e., a composite display of display on the see-through panel 1 and display on the rear panel 2) is achieved without any color components other than the red light being mixed therein, although being affected by the display on the rear panel 2. Since the see-through panel 1 does not transmit light during the green light displaying period and the blue light displaying period, green light and blue light going out of the rear panel 2 do not affect display on the see-through panel 1. Therefore, without degrading color purity, the see-through panel 1 is able to achieve desirable display.

As a reference example, FIGS. 15(*a*) to (*c*) show diagrams corresponding to FIGS. 14(*a*) to (*c*), in the case where the see-through panel 1 performs multicolor displaying by the field sequential method and the rear panel 2 performs multicolor displaying by using a white light source and color filters.

Again, it is assumed that the rear panel 2 performs white displaying while the see-through panel 1 performs red displaying. In this case, as shown in FIG. 15(*a*), to perform white displaying, the rear panel 2 of the reference example allows red light, green light, and blue light to continuously go out from the R subpixel, the G subpixel, and the B subpixel. On the other hand, as shown in FIG. 15(*b*), the see-through panel 1 allows red light to be transmitted in the red light displaying period but does not allow green light and blue light to be transmitted in the green light displaying period and in the blue light displaying period.

In this case, as shown in FIG. 15(*c*), the color of red displaying by the see-through panel 1 is affected by the white displaying of the rear panel 2. This is because, in the red displaying period of the see-through panel 1, not only red light from the R subpixel but also green light and blue light from the G subpixel and the B subpixel are going out from the rear panel 2 toward the see-through panel 1. As a result, display on the see-through panel 1 to be observed (i.e., a composite display of display on the see-through panel 1 and display on the rear panel 2) appears whitened, indicative of degraded color purity.

Figure 16:
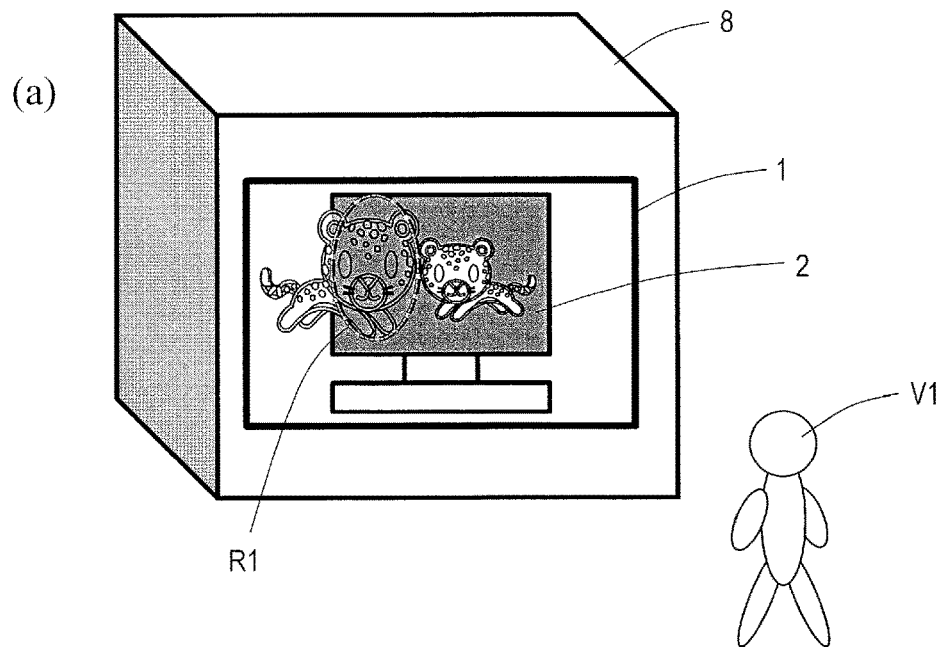
Figure 16:
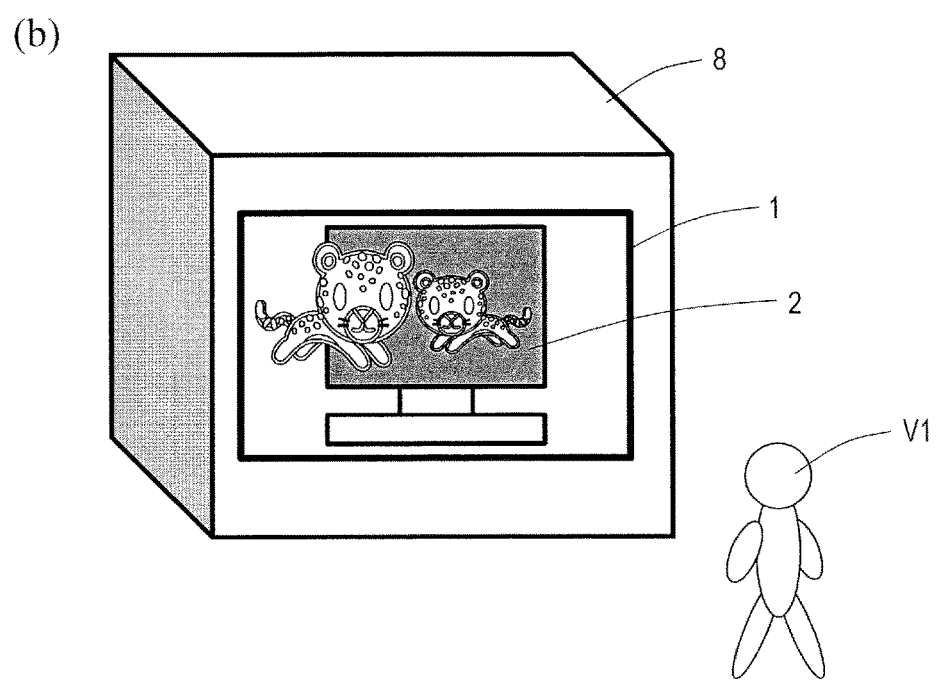

FIGS. 16(*a*) and (*b*) show, in the case where the see-through panel 1 is driven by the field sequential method, differences in display resulting from driving the rear panel 2 by a color filter method (FIGS. 15(*a*) to (*c*)) and from driving the rear panel 2 by a synchronized field sequential method (FIGS. 14(*a*) to (*c*)). As shown in FIG. 16(*a*), when the rear panel 2 is driven by the color filter method, in its region R1 overlapping the rear panel 2, the displayed image on the see-through panel 1 is not perceived by the viewer V1 in the desired color. This is because the color of the displayed image on the rear panel 2 is admixed to the color of the displayed image on the see-through panel 1. On the other hand, as shown in FIG. 16(*b*), when the rear panel 2 is also driven by the field sequential method, the displayed image on the see-through panel 1 can be displayed in the desired color irrespective of the displayed image on the rear panel 2.

Embodiment 3

FIGS. 17(*a*) and (*b*) are perspective views showing a see-through panel 1 which is included in a liquid crystal display device according to Embodiment 3, where FIGS. 17(*a*) and (*b*) respectively show see-through panels according to different implementations. In either implementation, the see-through panel 1 includes a TN-type liquid crystal layer 1L, and wide-view films (hereinafter referred to as WV films) 1WF and 1WB for effecting viewing angle compensation are interposed between the front-side polarizing plate 1F and the rear-side polarizing plate 1B, respectively, and the liquid crystal layer 1L.

In the implementation shown in FIGS. 17(*a*) and (*b*), it is preferable that the rubbing axis (an axis as represented in terms of 360° azimuth angle, including the pretilt angle) AA2 of a rear-face alignment film (not shown) which is in contact with the liquid crystal layer 1L coincides with the axis AW2 of the rear-face WV film 1WB. As used herein, the axis of a WV film refers to the major-axis direction of the index ellipsoid. For example, in the case where the WV film is made of a discotic liquid crystal, the axis of the WV film would correspond to an axis direction that is obtained by, in a discotic liquid crystal under gradual inclination (in a manner of rising), projecting the normals of such disk-like molecular planes onto the substrate plane.

Moreover, it is preferable that the rubbing axis AA1 of the front-face alignment film (not shown) coincides with the axis AW1 of the front-face WV film 1WF. The reason is that, in order to obtain a viewing angle improving effect, it is desirable that the pretilt direction that is defined through rubbing treatment and the axis of the WV film are identical.

Thus, light leakage as viewed obliquely can be compensated for by ensuring that the pretilt directions (or the rubbing axes) are identical with the axes of the WV films, even in the case where liquid crystal molecules near the alignment film maintains their pretilt direction under a vertical field being applied (during black displaying). This broadens the viewing angle.

On the other hand, the rubbing axes AA1 and AA2 of the front-face and rear-face alignment films and the polarization axes (which herein are transmission axes) A1 and A2 of the front-face and rear-side polarizing plates 1F and 1B may be set parallel as shown in FIG. 17(*a*), or set orthogonal as shown in FIG. 17(*b*). In either case, when liquid crystal molecules take a 90° twisted alignment in the liquid crystal layer 1L, the polarization plane of polarized light having been passed through the rear-side polarizing plate 1B can be rotated by 90°. Therefore, in either one of the implementations shown in FIGS. 17(*a*) and (*b*), proper displaying can be achieved by using the front-face and rear-side polarizing plates 1F and 1B placed in crossed Nicols.

FIG. 18 illustrates an implementation, as shown in FIG. 17(*b*), a liquid crystal display panel in which the transmission axes A1 and A2 of the polarizing plates 1F and 1B are orthogonal to the rubbing axes AA1 and AA2 is used either as the see-through panel 51 or as the rear panel 52 (herein used as the see-through panel 51). As the other liquid crystal display panel (i.e., the rear panel 52 herein), as shown in FIG. 17(*a*), a liquid crystal display panel is used in which the transmission axes A1 and A2 of polarizing plates 1F and 1B are parallel to the rubbing axes AA1 and AA2. In other words, in the liquid crystal display device according to the present embodiment, two types of liquid crystal display panels are arranged one after the other: a liquid crystal display panel in which the transmission axes or absorption axes of the polarizing plates are parallel to the rubbing axes of the alignment films (or the axes of the WV films) and a liquid crystal display panel in which the transmission axes or absorption axes of the polarizing plates are orthogonal to the rubbing axes of the alignment films (or the axes of the WV films).

In this case, even by setting the transmission axis A2 of the rear-side polarizing plate 1B of the see-through panel 51 and the transmission axis A3 of the front-side polarizing plate 2F of the rear panel 52 so as to be parallel, it can be ensured that the twist azimuths of the liquid crystal layers 1L and 2L under twist alignment are identical between both liquid crystal display panels 51 and 52. This provides for good viewing angle characteristics.

In some cases, a polarizing plate and a WV film may be marketed as a functional optical film which is produced by laminating and integrating them. In the case where two different types of liquid crystal display panels are used in the manner described above, as can be seen from FIGS. 17(a) and (b), it is preferable to provide two optical films, that is: one in which the polarization axis and the axis of the WV film are parallel and another in which the polarization axis and the axis of the WV film are orthogonal.

Thus, embodiments of the present invention have been described above; however, various modifications are possible. For example, the electrode structure of the see-through panel 1 is not limited to the implementation shown in FIG. 6 and FIG. 7. For example, in the TFT substrate, not only the upper electrode but also the lower electrode may have slits. Further improvements in response characteristics and light transmittance are made possible by the lower electrode having slits. Moreover, the upper electrode may be formed by a pair of interdigitated electrodes meshing with each other. A lateral field can be generated with this pair of interdigitated electrodes.

Although the above-illustrated see-through panel 1 includes a TN-type liquid crystal layer, a liquid crystal layer having homogeneous alignment may also be used. More specifically, in the construction of the liquid crystal display panel 200 shown in FIG. 6 and FIG. 7, the pretilt direction defined by one horizontal alignment film 14 and the pretilt direction defined by the other horizontal alignment film 24 may be made parallel or antiparallel to each other, so that the pretilt direction that is defined by each horizontal alignment film 14, 24 is substantially orthogonal to the direction dl that the slits 11a of the upper electrode 11 extend. In this case, too, the polarizing plates 15 and 25 are placed in crossed Nicols, and the transmission axes 15a and 25a of the polarizing plates 15 and 25 are set so as to constitute an angle of substantially 45° with respect to the pretilt direction that is defined by the horizontal alignment film 14, 24.

Under this construction, black displaying can be performed by generating a vertical field across the liquid crystal layer 30 and aligning the liquid crystal molecules 31 substantially vertical to the substrate plane. Also, white displaying can be performed by generating a lateral field (fringing field) across the liquid crystal layer 30 and aligning the liquid crystal molecules 31 substantially parallel to the substrate plane and substantially orthogonal to the direction dl that the slits 11a of the upper electrode 11 extend (i.e., aligning the liquid crystal molecules 31 so as to constitute an angle of substantially 45° with respect to the transmission axes 15a and 25a of the polarizing plates 15 and 25 by using the lateral field). Also, a transparent displaying state can be achieved in a state where no voltage is applied to the liquid crystal layer 30 so that the liquid crystal molecules 31 take a homogeneous alignment (where the major-axis directions of the liquid crystal molecules 31 are aligned so as to constitute an angle of substantially 45° with respect to the transmission axes 15a and 25a of the polarizing plates 15 and 25). Light transmittance is the highest in this transparent displaying state.

Even in the case where a see-through panel and a rear panel whose liquid crystal layer thus exhibits homogeneous alignment are used, display on the rear panel that is placed at the rear face of the see-through panel can be properly performed by properly setting the polarization axes of the polarizing plates in both panels.

INDUSTRIAL APPLICABILITY

According to an embodiment of the present invention, there is provided a liquid crystal display device in which, via a see-through panel, display on a rear panel that is placed on the rear face side thereof can be seen. A liquid crystal display device according to an embodiment of the present invention can be used as a display device for an information display or digital signage, for example.

REFERENCE SIGNS LIST 1 see-through panel
1B rear-side polarizing plate
1F front-side polarizing plate
1L liquid crystal layer
2 rear panel
2B rear-side polarizing plate
2F front-side polarizing plate
2L liquid crystal layer
3 light source
4, 6 TFT substrate
5, 7 counter substrate
8 case
10 TFT substrate (rear substrate)
10a transparent substrate
11 first electrode (upper electrode)
11a slit
11b branch
12 second electrode (lower electrode)
13 insulating layer
14 first horizontal alignment film
15 first polarizing plate
15a transmission axis of first polarizing plate
16A first TFT
16B second TFT
16d drain electrode
16g gate electrode
16s source electrode
17 gate bus line
18 source bus line
20 counter substrate (front substrate)
20a transparent substrate
21 third electrode (counter electrode)
24 second horizontal alignment film
25 second polarizing plate
25a transmission axis of second polarizing plate
30 liquid crystal layer
31 liquid crystal molecule
100 liquid crystal display device
200 liquid crystal display panel
210 illumination element

The invention claimed is:

1. A liquid crystal display device comprising:
a first liquid crystal display panel and a second liquid crystal display panel, the first liquid crystal display panel capable of being in a transparent displaying state, such that the first liquid crystal display panel allows at least a portion of light emitted from the second liquid crystal display panel to be transmitted in the transparent displaying state, wherein,
the first liquid crystal display panel includes a pair of substrates, a first liquid crystal layer between the pair of substrates, and a first polarizer and a second polarizer between which the first liquid crystal layer is interposed;
the second liquid crystal display panel includes a pair of substrates, a second liquid crystal layer between the pair of substrates, and a third polarizer on a side of the second liquid crystal layer that is closer to the first liquid crystal display panel;
the second polarizer of the first liquid crystal display panel is on a side closer to the second liquid crystal display panel;
a transmission axis of the second polarizer and a transmission axis of the third polarizer are not orthogonal;
each of the first liquid crystal display panel and the second liquid crystal display panel includes a plurality of pixels;
each of substantially all of the plurality of pixels of the first liquid crystal display panel is capable of switchably presenting a black displaying state and a white displaying state;
each of substantially all of the plurality of pixels of the second liquid crystal display panel is capable of switchably presenting the black displaying state and the white displaying state;
the second liquid crystal layer is a twisted nematic-type liquid crystal layer; and
a twist direction of liquid crystal molecules in the first liquid crystal layer of the first liquid crystal display panel and a twist direction of liquid crystal molecules in the second liquid crystal layer of the second liquid crystal display panel are opposite to each other.

2. The liquid crystal display device of claim 1, wherein the first liquid crystal display panel performs multicolor displaying by a field sequential method.

3. The liquid crystal display device of claim 1, wherein the transmission axis of the second polarizer and the transmission axis of the third polarizer constitute an angle of not less than 0° and not more than 45°.

4. The liquid crystal display device of claim 3, wherein the transmission axis of the second polarizer and the transmission axis of the third polarizer are parallel.

5. The liquid crystal display device of claim 1, wherein the first liquid crystal layer is a twisted nematic-type liquid crystal layer, and the first polarizer and the second polarizer are oriented in crossed Nicols.

6. The liquid crystal display device of claim 2, wherein both of the first liquid display panel and the second liquid crystal display panel perform multicolor displaying by a field sequential method.

7. The liquid crystal display device of claim 1, wherein the first liquid crystal display panel does not include any color filters.

8. The liquid crystal display device of claim 1, wherein the first liquid crystal display panel and the second liquid crystal display panel at least partially overlap when viewed from a normal direction.

9. The liquid crystal display device of claim 1, wherein,
the first liquid crystal display panel includes a first horizontal alignment film on a side of the first liquid crystal layer that is closer to the first polarizer, the first horizontal alignment film having a first direction of alignment regulation and being in contact with the first liquid crystal layer;
the second liquid crystal display panel includes a second horizontal alignment film on a side of the second liquid crystal layer that is closer to the third polarizer, the second horizontal alignment film having a second direction of alignment regulation and being in contact with the second liquid crystal layer; and
an absorption axis of the first polarizer and the first direction of alignment regulation are parallel, and an absorption axis of the second polarizer and the second direction of alignment regulation are orthogonal.

10. The liquid crystal display device of claim 1, wherein,
the first liquid crystal display panel includes a first horizontal alignment film on a side of the first liquid crystal layer that is closer to the first polarizer, the first horizontal alignment film having a first direction of alignment regulation and being in contact with the first liquid crystal layer;
the second liquid crystal display panel includes a second horizontal alignment film on a side of the second liquid crystal layer that is closer to the third polarizer, the second horizontal alignment film having a second direction of alignment regulation and being in contact with the second liquid crystal layer; and
an absorption axis of the first polarizer and the first direction of alignment regulation are orthogonal, and an absorption axis of the second polarizer and the second direction of alignment regulation are parallel.

11. The liquid crystal display device of claim 1, wherein,
the first liquid crystal display panel includes a first substrate and a second substrate as the pair of substrates, such that the first liquid crystal layer is interposed between the first substrate and the second substrate;
the first substrate includes a first electrode and a second electrode which generates a lateral field across the first liquid crystal layer with the first electrode;
the second substrate includes a third electrode which generates a vertical field across the liquid crystal layer with the first electrode and the second electrode, the third electrode opposing the first electrode and the second electrode; and
for each pixel, the first liquid crystal display panel is capable of switchably presenting a black displaying state where black displaying is performed with a vertical field generated across the first liquid crystal layer, a white displaying state where white displaying is performed with a lateral field generated across the first liquid crystal layer, and the transparent displaying state, where a rear face side of the first liquid crystal display panel is visible in a see-through manner with no voltage applied to the first liquid crystal layer.

* * * * *